United States Patent
Myron et al.

(10) Patent No.: US 6,725,552 B2
(45) Date of Patent: Apr. 27, 2004

(54) METHODS AND APPARATUS FOR MOUNTING AND ALIGNING AN OCCUPANCY SENSOR

(75) Inventors: Douglas D. Myron, Austin, TX (US); Jonathan D. Williams, Austin, TX (US); R. Kurt Bender, Dripping Springs, TX (US)

(73) Assignee: Hubbell Incorporated, Orange, CT (US)

(*) Notice: Subject to any disclaimer, the term of this patent is extended or adjusted under 35 U.S.C. 154(b) by 0 days.

(21) Appl. No.: 10/159,197

(22) Filed: May 30, 2002

(65) Prior Publication Data

US 2003/0221324 A1 Dec. 4, 2003

(51) Int. Cl.$^7$ ................................................. G01C 5/00
(52) U.S. Cl. ............................................. 33/286; 33/227
(58) Field of Search ........................... 33/286, 227, 228, 33/263, 275 R

(56) References Cited

U.S. PATENT DOCUMENTS

| | | | | |
|---|---|---|---|---|
| 3,734,534 A | * | 5/1973 | Brooks et al. | 280/163 |
| 4,177,964 A | * | 12/1979 | Hujsak et al. | 33/286 |
| 4,496,905 A | | 1/1985 | Forte et al. | 324/414 |
| 5,046,961 A | | 9/1991 | Hoffman | 439/141 |
| 5,108,297 A | | 4/1992 | Hoffman et al. | 439/134 |
| 5,280,966 A | | 1/1994 | Morris et al. | 285/89 |
| 5,323,116 A | | 6/1994 | Atria | 324/511 |
| 5,505,000 A | * | 4/1996 | Cooke | 33/286 |
| 5,557,207 A | | 9/1996 | Duve | 324/414 |
| 5,562,483 A | | 10/1996 | Hoffman | 439/469 |
| 5,568,265 A | * | 10/1996 | Matthews | 33/286 |
| 5,640,143 A | | 6/1997 | Myron et al. | 340/541 |
| 5,782,653 A | | 7/1998 | Sandor | 439/467 |
| 5,885,099 A | | 3/1999 | Sandor | 439/467 |
| 5,986,357 A | | 11/1999 | Myron et al. | 307/116 |
| 5,987,762 A | * | 11/1999 | Toth et al. | 33/286 |
| 6,078,253 A | | 6/2000 | Fowler | 340/501 |
| 6,087,834 A | | 7/2000 | Tury et al. | 324/414 |
| 6,222,191 B1 | | 4/2001 | Myron et al. | 250/353 |
| 6,374,507 B1 | * | 4/2002 | Lehto | 33/645 |
| 6,378,822 B1 | * | 4/2002 | Franks | 248/218.4 |
| 6,434,841 B1 | * | 8/2002 | Stahl et al. | 33/286 |
| 6,438,854 B1 | * | 8/2002 | Kott, Jr. | 33/286 |
| 6,537,274 B1 | * | 3/2003 | Katz | 606/56 |

OTHER PUBLICATIONS

"Installation and use of LightBAT™ G2 Laser Alignment Tool LB–LAT–1," 2 pages, Brochure form MYTECH Corporation, Feb. 28, 2002.
"LightBAT G2 Accessories," 1 page, Brochure from MYTECH Corporation, Feb. 19, 2002.
"LightBAT G2—Dual–level Switching Controller and PIR Sensor," 4 pages, Brochure from MYTECH Corporation, Mar. 5, 2002.
MYzer™ Port Application Guide, 2 pages, brochure from MYTECH Corporation, Jul. 10, 2001.
"MYzer™ Port Connector System (Quick Connection to MYTECH's LightBat G2™ HID Hi/Low Controller)," 1 page, Brochure from MYTECH Corporation, Jul. 10, 2001.
"See the Light," Automatic Lighting, Occupancy Sensors & HID Controls," the MYTECH 2002 Product Catalog, MYTECH Corporation, Jan. 3, 2002.
"The Light/BAT™ G2 integrated HID Dual Level Switching Controller and Sensor," 7 pages, brochure from MYTECH Corporation, Jun. 6, 2001.

* cited by examiner

Primary Examiner—Christopher W. Fulton
(74) Attorney, Agent, or Firm—Fulbright & Jaworski, LLP

(57) ABSTRACT

Methods and apparatus are provided for mounting and aligning a modular lamp controller. A representative embodiment includes a mounting adapter assembly and a laser alignment tool. The mounting adapter assembly is configured to couple to a housing of the modular lamp controller and includes a jam nut and a mounting adapter. The mounting adapter includes internal threads for connecting to a mounting pipe, external threads for locating the jam nut, and a step configured to revolve around an axis of the mounting adapter. The step is configured to rotatably lock the housing. The laser alignment tool is configured to couple to the housing and includes a bracket configured to couple to the housing and a laser coupled to the bracket.

14 Claims, 24 Drawing Sheets

METHODS AND APPARATUS FOR MOUNTING AND ALIGNING AN OCCUPANCY SENSOR

Each of U.S. Pat. Nos. 5,640,143; 5,986,357; 6,078,253; and 6,222,191 is hereby incorporated by reference.

BACKGROUND OF THE INVENTION

1. Field of the Invention

The present invention relates generally to occupancy sensors and more particularly to methods and apparatus for mounting and aligning occupancy sensors. In a representative but non-limiting embodiment, a modular lamp controller contains an occupancy sensor that may be mounted and aligned using a mounting adapter assembly and a laser alignment tool.

2. Background

Some HID lamps may be operated at reduced power. This can provide not only energy savings and reduce cooling expenses, but can also reduce power consumption during peak demand periods. Some lamp types are suitable light sources at both low and high power.

Conventional dimming systems for HID lamps have been available for many years. One scheme uses a ballast, two capacitors, a switch, and the HID lamp. Several ballast types and configurations may be used. The main requirement for conventional dimming systems is that the electrical inclusion and removal of an impedance in the ballast circuit will cause the lamp to burn at desired power levels.

Most lamp manufacturers have made recommendations about the operation of their lamps with dimming systems. Typically, they require that the lamps must be operated at full power for a minimum warm-up time before they are allowed to operate at lower power. The lamps must also not be operated below a minimum power.

A Constant Wattage Autotransformer (CWA) or constant wattage isolated (CWI) type ballast arrangement 100 is shown in FIG. 1 (prior art). If dotted line 101 is connected, this figure illustrates a CWA ballast. If it is not connected, the figure illustrates a CWI ballast. The magnetically coupled coils 102 represent the ballast. Element 103 is the AC supply to the fixture, and element 104 is an earth ground connection. Element 105 is the capacitor in the fixture. Element 106 is the lamp mogul, and element 107 is the lamp and/or lamp fixture, which may be an HID lamp.

FIG. 2 (prior art) shows the connections used for a conventional dimming system 200 using a series capacitor arrangement. FIG. 3 (prior art) shows the connections used for a conventional dimming system 300 using a parallel capacitor arrangement. In both arrangements, the switch 203 is used to include or remove a connection to one terminal of one of the capacitors in the circuit. The capacitor values for either series or parallel combination may be selected so that closing the switch operates the lamp at full power. When the switch is closed, the lamp is in series with a higher valued capacitance and operates at full power. When the switch is open, the capacitance is reduced, and the lamp drops to a lower power. Lumen output and color temperature completely changes for most lamps within a minute of a commutation of the switch.

To achieve a conventional dimming system, capacitor 105 of FIG. 1 has been replaced by capacitors 201 and 202 in FIG. 2. Capacitor 105 of FIG. 1 has been replaced by capacitors 301 and 302 in FIG. 3. Elements in the ballast circuit that are in series may be manipulated with reference to position and polarity without changing the performance. The threaded portion of the mogul base remains connected to an electrical potential close to neutral or earth ground for safety. The most likely connection points based on ease-of-wiring to real fixtures are shown as elements 204 and 205 of FIG. 2 and elements 303 and 304 of FIG. 3.

If the capacitance required for full power operation is 20 uF, and the capacitance required for low power is 15 uF, suitable values of 201, 202, 301, and 302 may be readily determined. In one example, they are 20, 60, 15, and 5 uF respectively. A series combination will require two larger value capacitors (20 and 60 uF) than a parallel combination (15 and 5 uF) for the same full power (20 uF) and low power (15 uF) combined values. This means that the series choice will most likely be physically larger than the parallel choice. For this reason, most conventional dimming systems utilize parallel combinations, when available.

The series combination has lower voltage across the switched capacitor and switch. In FIG. 2, the voltage from ballast to lamp is divided between capacitors 201 and 202 if switch 203 is open and across 201 when the switch is closed. In FIG. 3, the full voltage from ballast to lamp is applied to both capacitors 301 and 302 when the switch is closed.

Installing a conventional dimming system is normally accomplished by replacing the designed capacitor for a ballast with either two separate capacitors or a dual capacitor. Inconveniently, conventional systems require that the fixture be taken down and taken apart for installation.

In the configuration used with FIGS. 2 and 3, one controller may be used to control and power many switches, but there is no way for the controller to know how long specific controlled lamps have been warming up. If the lamp shuts-down for any reason, the controller may not run that lamp for a new warm-up. If control is not present at the lamp fixture, it may result in incorrect warm-up or no warm-up at all, which may damage lamp 107.

Any occupancy sensor (not shown) used with these conventional dimming systems is typically mounted separately from the switch and control. The occupancy sensor requires separate alignment and mounting, which may be very inconvenient and time consuming.

Troubleshooting of conventional systems is time consuming, problematic, and often requires that the lamp be taken down and taken apart.

One significant problem with conventional dimmer systems is that it is difficult to determine if a problem stems from the lamp, fixture, or system. Since the fixture must be taken apart for the installation, problems may be found anywhere from the lamp to the connection to the mains. Damage may occur to the lamp in handling during installation of the system. The only way to remove the switch and control from the system is to remove the wire connections to them. Isolating part of the system for testing is difficult without first taking the fixture apart.

In addition, components may be damaged during the troubleshooting period. If too large a capacitor is installed in series with the lamp, it could cause excessive heat and damage components. If parallel capacitors are reversed, it can cause the lamp to extinguish when switched to low power. This puts extra wear on the ignitor used with some lamps. If too small a capacitor is installed in series with the lamp, it may not allow the lamp to start at all. This puts extra wear on the ignitor and may damage the lamp electrodes over time.

If the control wiring is incorrect, every connected switch will be affected. Improper or missing warm-up will cause premature end-of-life and lower lumen output for the lamps. If there is an open in the circuit, the lamp will not ignite, but if an ignitor is used, it may run continuously. This will limit the life of the ignitor.

Further, with conventional systems, it is difficult to quickly see if a lamp is stuck in either high or low power if there is no simple way to change state. If a controller is present with the switch 203, it may not allow the lamp fixture to dim if it is in a warm-up period. Warm-up periods may range from a few minutes to half an hour depending on the lamp. This is a long time to wait before testing a system. If the switch 203 is independent at the lamp fixture 108, a control has to be wired to enable a test. There is no built-in mechanism to perform a simple test of conventional systems.

Troubleshooting is even more difficult when there are multiple lamp fixtures 108 connected to one occupancy sensor (not shown). Not only are there a larger number of connections per occupancy sensor, but also an occupancy sensor used to control many fixtures is more likely to be improperly aligned. The space the occupancy sensor has to cover is typically large, so small adjustments to sensor mounting may have large effects on coverage. Improper alignment of one sensor has a larger impact on useful energy savings when it is controlling many fixtures.

A maximum in useful energy savings corresponds to a good match in occupancy sensor coverage to illumination. If the occupancy sensor coverage is too large such that a controlled lamp does not contribute light to a large portion of the coverage zone, it may burn at full power when no one is using the light. If the sensor coverage is smaller than the contributed light of all controlled fixtures, the lights may not be triggered to full power reliably for the occupant.

In sum, conventional systems suffer from several shortcomings. The referenced shortcomings are not intended to be exhaustive, but rather are among many that tend to impair the effectiveness of previously known techniques concerning the control, and particularly dimming control, of lamps. Other noteworthy problems may also exist; however, those mentioned here are sufficient to demonstrate that methodology appearing in the art have not been altogether satisfactory and that a significant need exists for the techniques described and claimed herein.

In particular, a need exists for a modular lighting control system suitable for use with HID lamps that is easy to install, align, maintain, troubleshoot, and repair. More particularly, a need exists for methods and apparatus to reliable mount and align occupancy sensors, including occupancy sensors built into modular lighting control systems.

SUMMARY OF THE INVENTION

Shortcomings of the prior art are reduced or eliminated by the techniques discussed in this disclosure. In an illustrative embodiment, mounting and aligning of on occupancy sensor are accomplished using a mounting adapter assembly and laser alignment tool, respectively. The mounting adapter assembly allows the occupancy sensor to be mounted in place while still having the freedom to rotate about an axis. The laser alignment tool allows a laser light to be shone onto a target to indicate proper alignment of the sensor. The mounted occupancy sensor is rotated until the laser shines onto the target, and is subsequently locked into place using the mounting adapter and jam nut of the mounting adapter assembly.

In one respect, the invention involves a laser alignment tool for aligning the field of view of an occupancy sensor. The laser alignment tool includes a bracket, a clip, and a laser. The clip is coupled to the bracket and is configured to removably couple to the occupancy sensor. The laser is coupled to the bracket.

In other respects, the clip may be configured to couple to a recess of the occupancy sensor. The clip may be configured to couple to the recess upon rotation of the clip within the recess. The occupancy sensor may be coupled to a modular lamp controller.

In another respect, the invention involves a mounting adapter assembly for mounting an occupancy sensor. The mounting adapter assembly includes a jam nut and a mounting adapter. The mounting adapter includes internal threads for connecting to a mounting pipe, external threads for locating the jam nut, and a step configured to revolve around an axis of the mounting adapter. The step is configured to rotatably lock the occupancy sensor.

In other respects, the mounting adapter assembly may be coupled to a modular lamp controller.

In another respect, the invention involves an apparatus for mounting and aligning a modular lamp controller. The apparatus includes a mounting adapter assembly and a laser alignment tool. The mounting adapter assembly is configured to couple to a housing of the modular lamp controller and includes a jam nut and a mounting adapter. The mounting adapter includes internal threads for connecting to a mounting pipe, external threads for locating the jam nut, and a step configured to revolve around an axis of the mounting adapter. The step is configured to rotatably lock the housing. The laser alignment tool is configured to couple to the housing and includes a bracket configured to couple to the housing and a laser coupled to the bracket.

In other respects, the step may be configured to revolve around a center axis of the mounting adapter. The laser alignment tool may also include a clip coupled to the bracket, which is configured to fit into a recess of the housing to secure and position the laser alignment tool relative to the housing. The clip may be configured to fit into the recess and rotate therein to secure and position the laser alignment tool relative to the housing. The clip may be configured to fit into the recess and rotate 90 degrees therein to secure and position the laser alignment tool relative to the housing. The apparatus may also include a lock nut configured to connect to the mounting pipe.

In another respect, the invention involves a method for mounting and aligning a modular lamp controller. A mounting adapter is threaded onto a mounting pipe using interior threads of the mounting adapter. A jam nut is threaded onto the mounting adapter using exterior threads of the mounting adapter. A step of the mounting adapter is inserted into a housing of the modular lamp controller to rotatably lock the housing. The modular lamp controller is aligned using a laser alignment tool coupled to the housing. A jam nut is tightened against the housing to lock the modular lamp controller in place.

In other respects, aligning the modular lamp may include rotating the housing until a laser spot from the laser alignment tool is aligned with a target. The method may also include attaching a lock nut to the mounting pipe.

Other features and associated advantages will become apparent with reference to the following detailed description of specific embodiments in connection with the accompanying drawings.

BRIEF DESCRIPTION OF THE DRAWINGS

The techniques of this disclosure may be better understood by reference to one or more of these drawings in combination with the detailed description of illustrative embodiments presented herein. Identical or similar elements use the same element number. The drawings are not necessarily drawn to scale.

FIGS. 18A–21B are schematic diagrams illustrating different fields of occupancy detection coverage for an occupancy sensor of a modular lamp controller, according to embodiments of the present disclosure. FIGS. 18A, 19A, 20A, and 21A show coverage along a length given the occupancy sensor is hanging a certain height above the floor. FIGS. 18B, 19B, 20B, and 21B show coverage along a width given the occupancy sensor is hanging a certain height above the floor.

DESCRIPTION OF ILLUSTRATIVE EMBODIMENTS

Modular lamp controllers of the present disclosure address shortcomings of conventional devices such as those discussed above. Installation cost, mounting and alignment problems, maintenance cost, troubleshooting time, repair time, and probability of lamp failure are all minimized.

Figure 4:
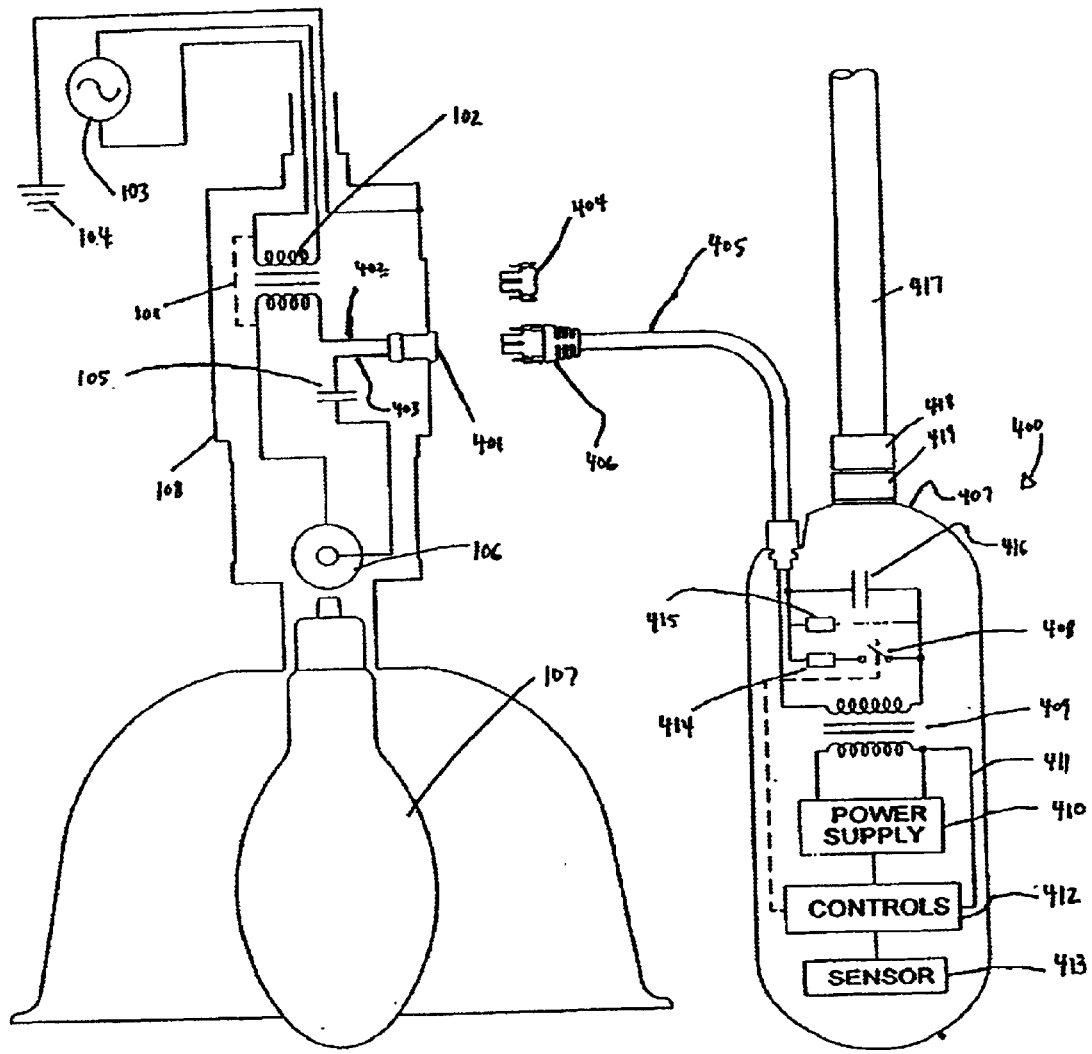
FIG. 4 is a schematic diagram of a modular lamp controller, according to embodiments of the present disclosure.

A representative embodiment of a modular lamp controller 400 is shown in, among other figures, FIG. 4. The lamp 107, which may be an HID lamp, includes a lamp capacitor 105 and a port 401. The port 401 is coupled to the capacitor 105 through wiring 402 and 403. The modular lamp controller 400 includes a housing 407, a plug 406, a cable 405, a capacitor 416, a switch 408, a transformer 409, a power supply 410, a switch controller 412, an occupancy sensor 413, impedances 414 and 415, and shorting plug 404.

Plug 406 has a shape complementary to port 401 so that the modular lamp controller 400 can securely connect to the lamp fixture 108. In different embodiments, the shape may vary. When plug 406 is attached to the port 401, lamp capacitor 105 becomes coupled to capacitor 416. In the illustrated embodiment, the coupling is a series connection. The operation of switch 408 correspondingly determines the power state of lamp 107. In the illustrated embodiment, operation of switch 408 toggles between a high (full) power state and a reduced (dim) power state. In other embodiments, power reducing members other than capacitor 416 may be used. For instance, any suitable device such as one or more resistors, potentiometers, or the like may be used within housing 407 of the modular lamp controller 400 to suitably reduce power output of lamp 107.

The nature of switch 408 may likewise vary. It may any type of device capable of defining different states. In one embodiment, switch 408 and the workings of the modular lamp controller 400 may be software-based or a combination of software and hardware, as understood in the art.

In different embodiments, the number of different power states may vary. As illustrated, lamp 107 is provided with two power states: a full and dim power setting. In other embodiments, the number of power states may be 3, 4, 5, 6, 7, 8, 9, 10, etc. In still other embodiments, if the power state is configured to be adjusted continuously, the number of power states may be infinite. If use of the modular lamp controller 400 is not desired, shorting plug 404 may be placed into port 401, and lamp 107 will light at full power at all times.

In the illustrated embodiment of FIG. 4, power supply 410 may draw power from current of lamp 107, although in other embodiments, an independent power supply (not shown) may be used.

Switch controller 412 acts in conjunction with occupancy sensor 413 to operate switch 408 to control the power state of lamp 107 based upon occupancy of the space being illuminated. Switch controller 412 refers not only to the actual mechanism for operating switch 408, but it also refers to the host of optional various control electronics that may be included within modular lamp controller 400, including but not limited to user inputs, control ports, and the like described herein. In particular, different embodiments of this disclosure involve switch controller 412 serving a variety of optional, specialized functions. For instance, switch controller 412 may contain logic that facilitates testing, user settings, internal checks and the like. These optional features may be implemented through dip switches 603 (see FIG. 6), push button 604 (see FIG. 6), control ports or any other similar mechanism.

Figure 9:
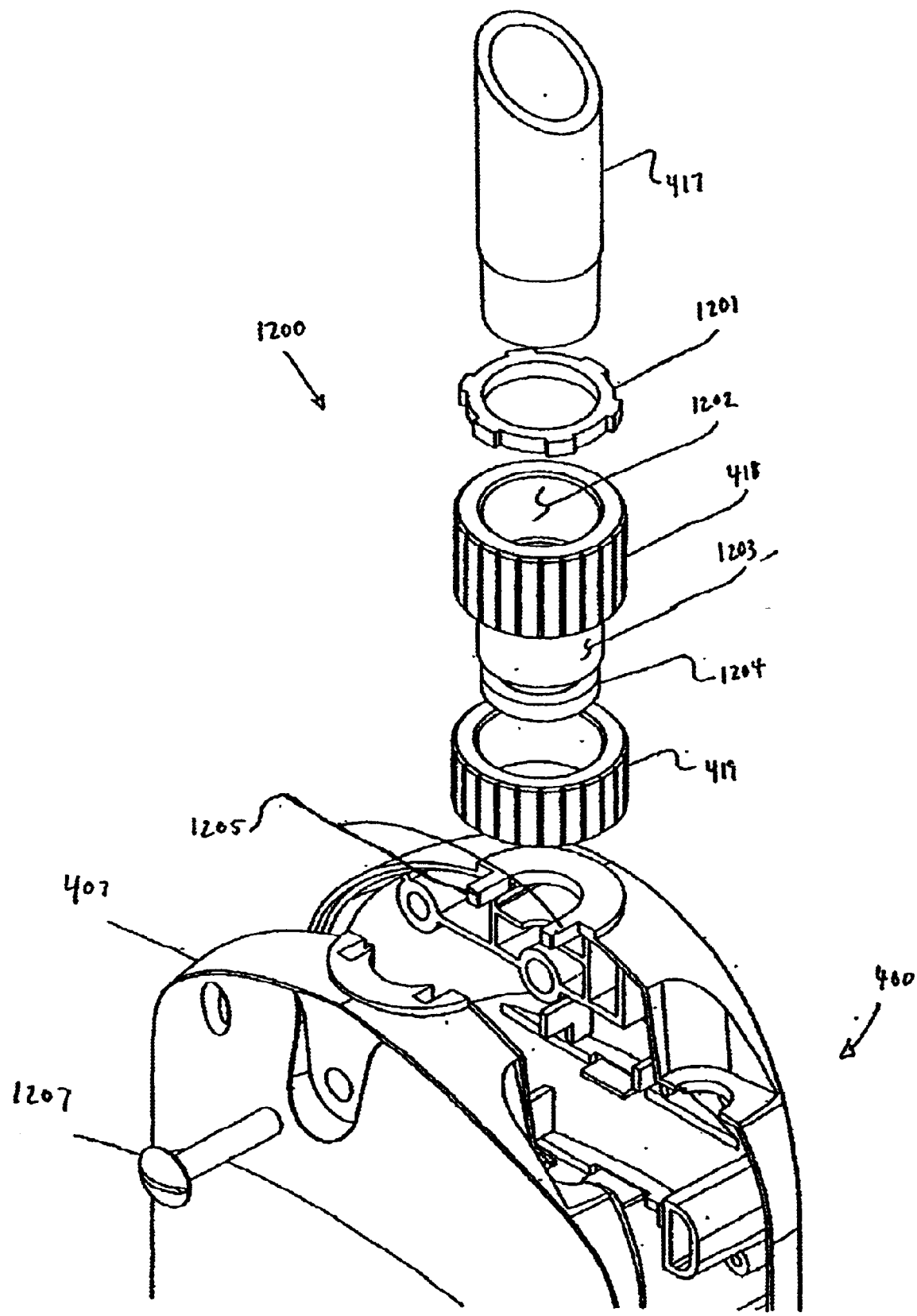
FIG. 9 is a schematic diagram illustrating a mounting adapter assembly for use with a modular lamp controller, according to embodiments of the present disclosure.
Figure 10:
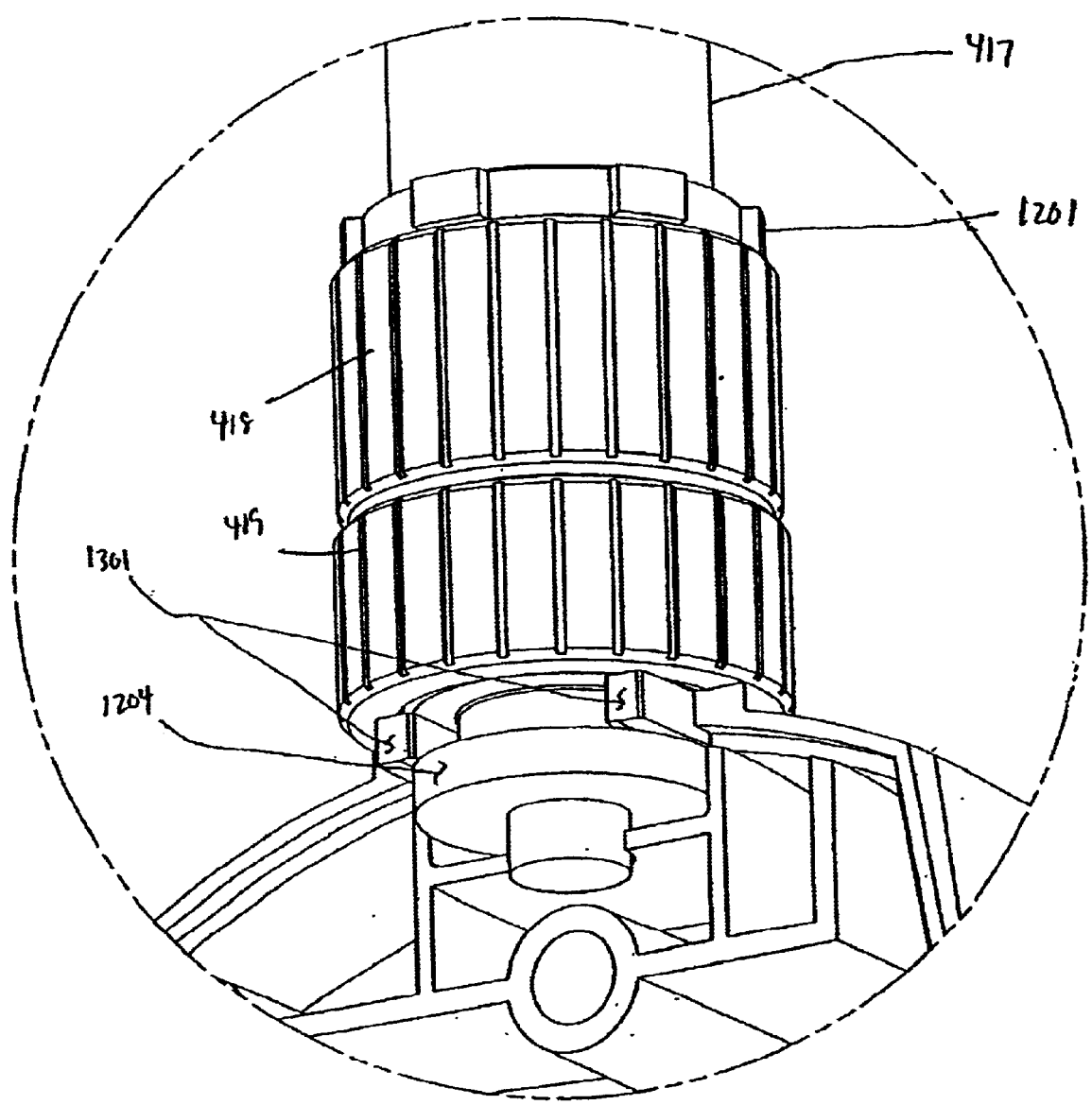
FIG. 10 is an exploded view of the mounting adapter assembly of FIG. 12.

FIGS. 9–10, among other figures, illustrate representative embodiments of a mounting adapter assembly 1200 that facilitates the mounting of modular lamp controller 400. With reference to FIG. 9, a mounting adapter 418 is shown having internal threads 1202, external threads 1203, and a step 1204. Also illustrated is a jam nut 419, a lock nut 1201, a mounting pipe 417, and housing 407 of the modular lamp controller 400. In operation, lock nut 1201 may be attached to the mounting pipe 417. Mounting adapter 418 may then be threaded onto the mounting pipe 417 using internal threads 1202. The jam nut 419 may be threaded onto the mounting adapter 418 using external threads 1203. The step 1204 may be placed within the housing 407, and more particularly the bosses 1205, of the modular lamp controller 400 to rotatably lock the modular lamp controller 400 (see 503 of FIG. 5, which exemplifies a possible rotation). In other words, the modular lamp controller 400 may be held in place but allowed to rotate about an axis of the mounting pipe 417. Once the modular lamp controller 400 is aligned through proper rotation about its longitudinal axis, it may be locked into place by tightening the jam nut 419 against the modular lamp controller housing 407. (See FIG. 10 for an exploded view).

Figure 11:
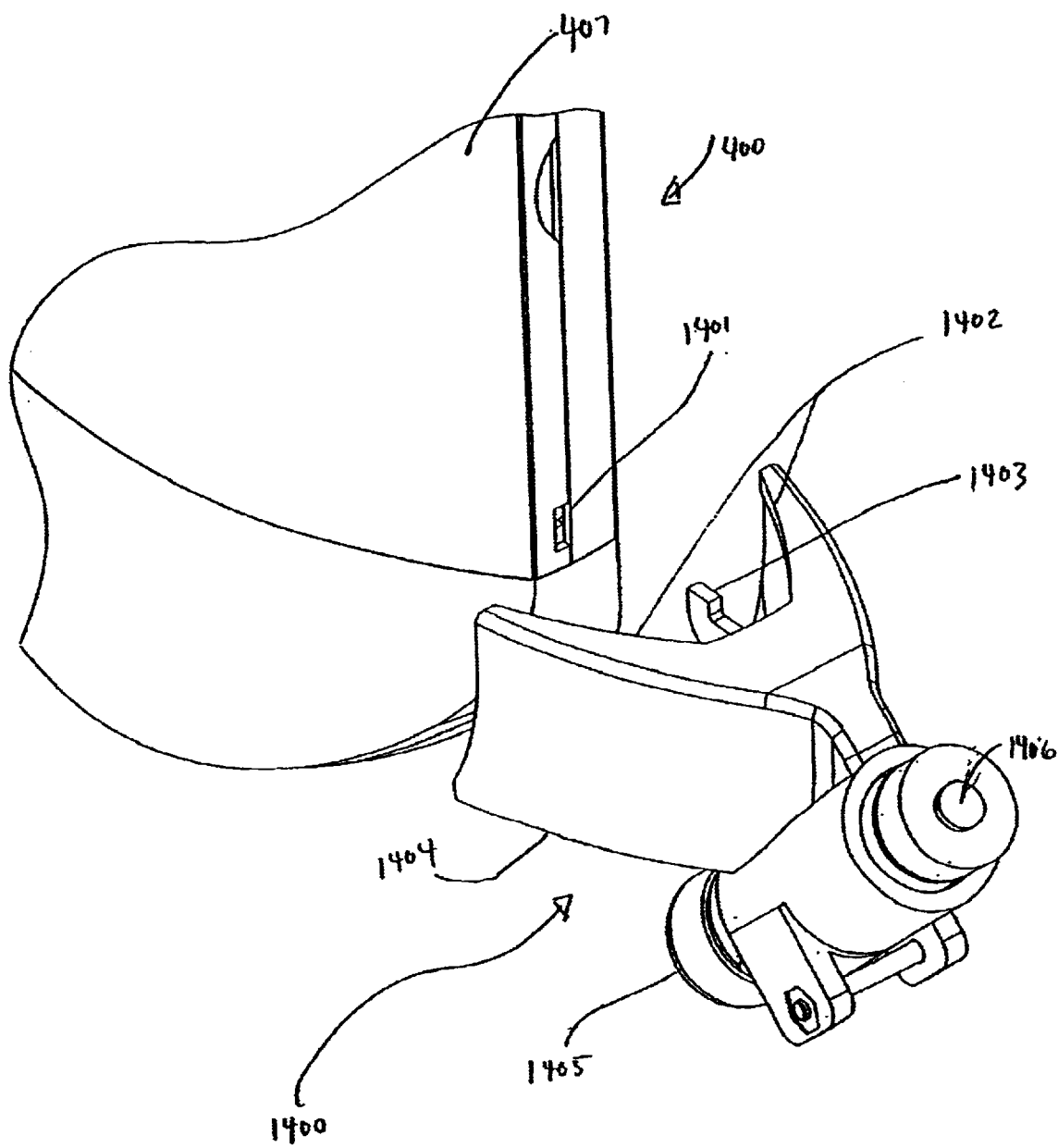
FIG. 11 is a schematic diagram illustrating a laser alignment tool for use with a modular lamp controller, according to embodiments of the present disclosure.

In one embodiment, the alignment of the modular lamp controller 400 may be accomplished through the use of a laser alignment tool 1400, which is illustrated in, among other figures, FIG. 11. As shown in FIG. 11, a laser 1405, having a power button 1407, may be attached to the housing 407 of modular lamp controller 400 via a bracket 1404 to align the unit. The exact location of laser 1405 relative to housing 407 may vary, but in the illustrated embodiment, it hangs near the bottom of the housing. In one embodiment, and with reference to FIG. 11, laser alignment tool 1400 may attach to a recess 1401 in the modular lamp controller housing 407. In particular, a clip 1403 may fit into the recess 1401. In one embodiment, clip 1403 may rotate within the recess 1401 to lock the bracket 1404 securely in place. As illustrated, bracket 1404 may be shaped to follow the contour of the housing (see arms 1402, illustrating one representative shape).

Once attached, laser 1405 may be turned on via button 1407 to shine a laser spot onto a target. The modular lamp controller 400 may be rotated (see 503 of FIG. 5) to move the laser spot to locate the target, which may be, in one embodiment, the center of a store aisle (see targets 1601 and 1602 of FIGS. 13A and 13B). Once the target is located, the modular lamp controller 400 may be locked into place using mounting adapter assembly 1200 and particularly, jam nut 419.

Figure 14:
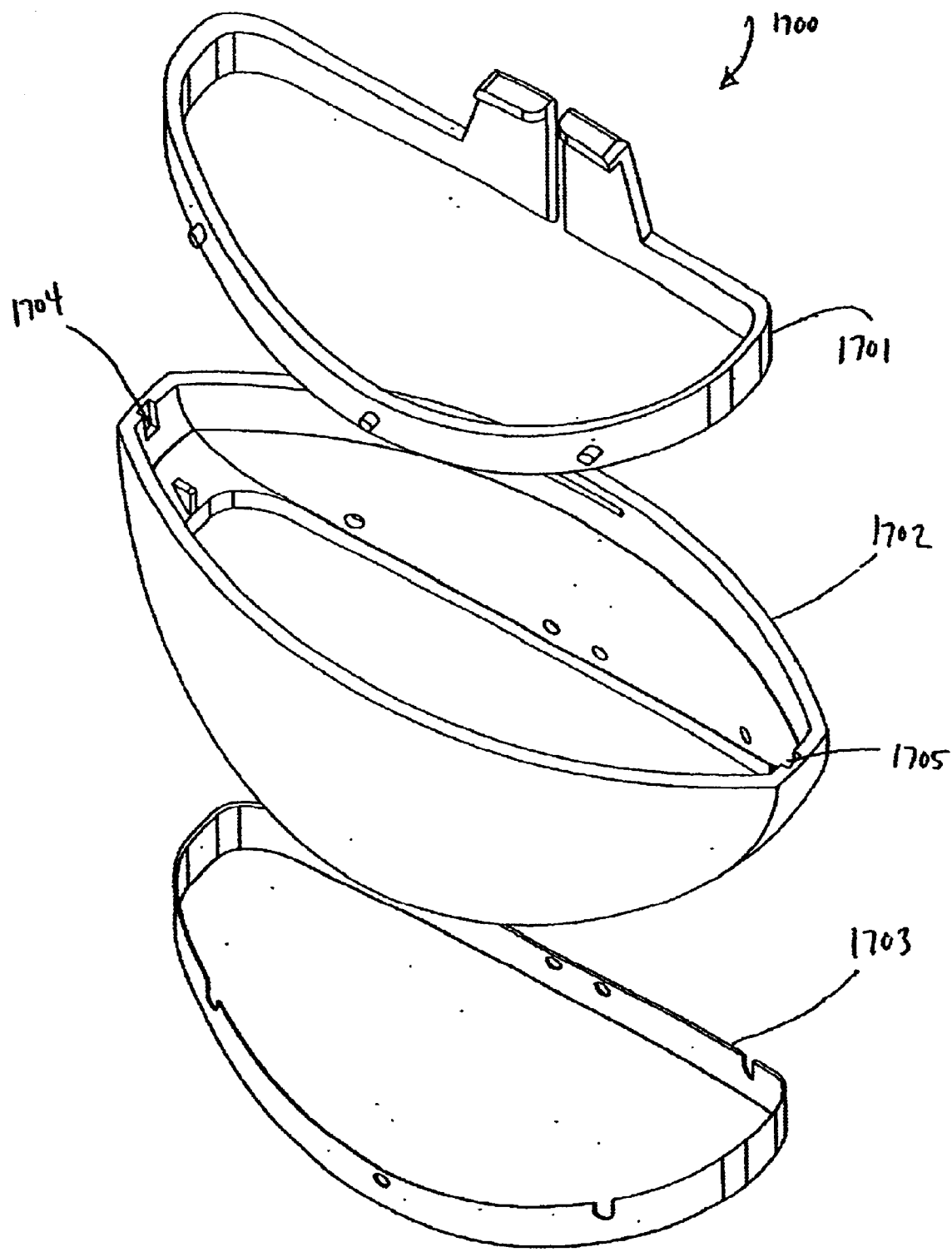
FIG. 14 is a schematic diagram of an interchangeable lens assembly unit for use with a modular lamp controller, according to embodiments of the present disclosure.

With reference to FIG. 4, the occupancy sensor 413 may include a passive infrared (PIR) detector, or any other suitable detection device, and may operate with suitable external or integrated optics. One embodiment of suitable detachable optics is illustrated in, among other figures, FIGS. 14–15. In these embodiments, interchangeable lens assembly unit 1700 may be attached directly to, and flush with, housing 407 of the modular lamp controller 400 to form an integral unit and housing (see FIGS. 4 and 16). Advantageously, interchangeable lens assembly unit 1700 may be easily exchanged (e.g., individual lenses 1703 may be changed) or modified (e.g., masking may be added) without disassembling the entire unit. In FIG. 14, interchangeable lens assembly unit 1700 includes a lens retainer 1701, a housing 1702, and a lens 1703. Different lenses may provide different coverage for the occupancy sensor (see FIGS. 18–21), and masking may be added to further modify the shape of that coverage (see FIGS. 17 and 22).

Figure 23:
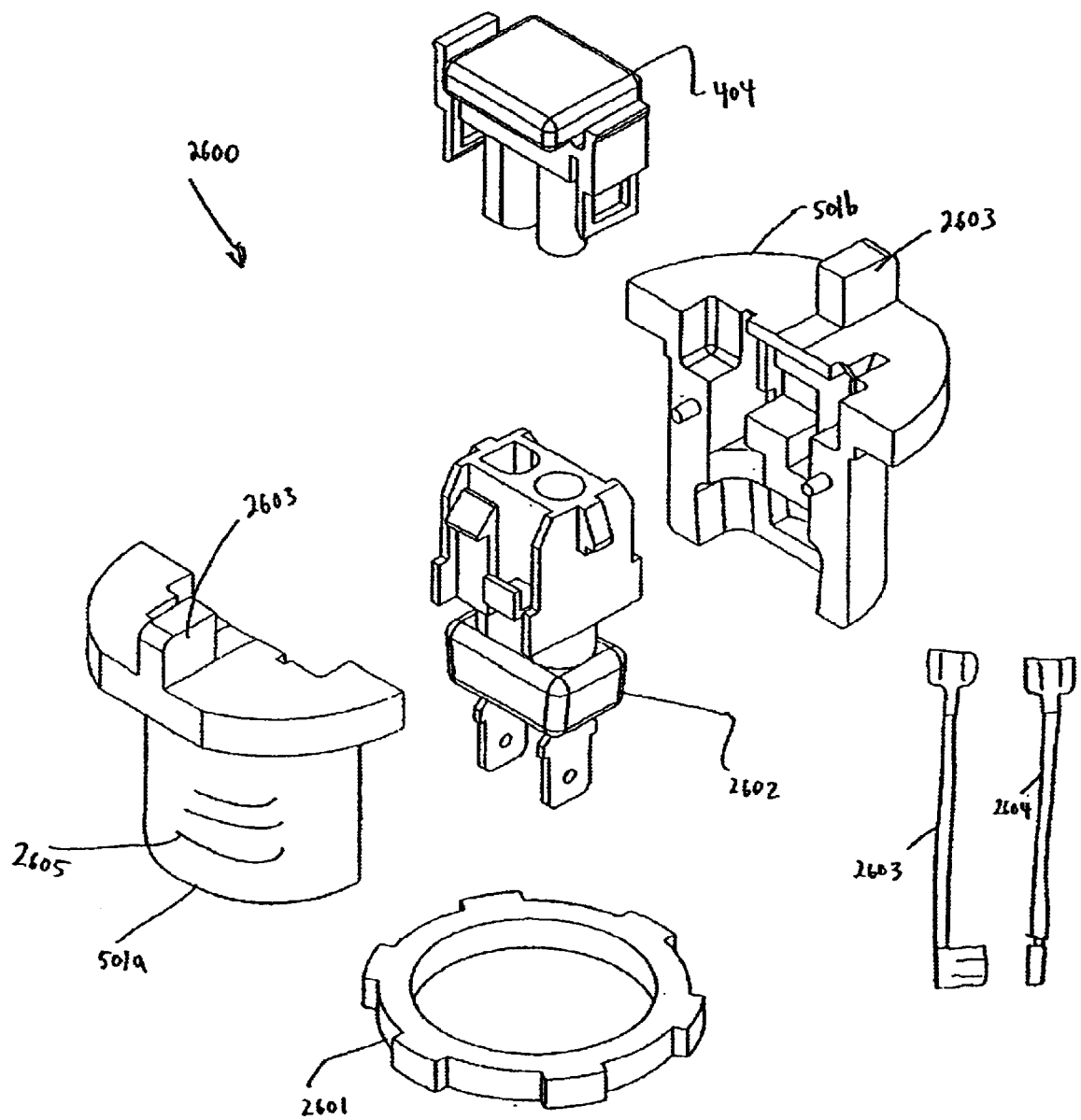
FIG. 23 is a schematic diagram illustrating a retrofitting kit for use with a modular lamp controller, according to embodiments of the present disclosure.
Figure 24:
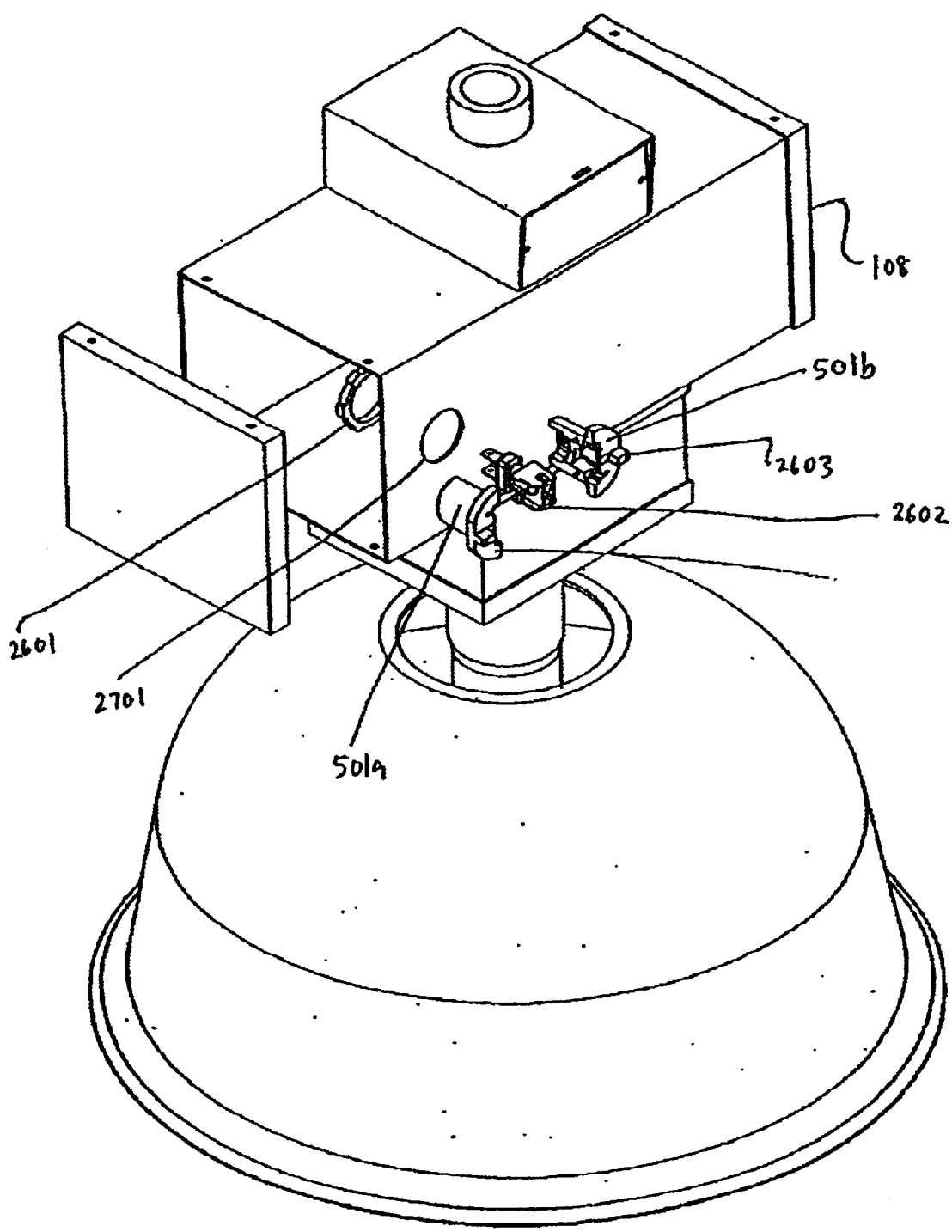
FIG. 24 is a schematic diagram illustrating the use of a retrofitting kit, according to embodiments of the present disclosure.

If a modular lamp controller 400 is to be used with equipment that does not have an external port 401, the port 401 may be readily installed using a retrofitting kit 2600, which is shown in, among other figures, FIGS. 23–24. With reference to FIG. 23, there is shown a port connector 2602, a first portion 501a of a port adapter, a second portion 501b of the port adapter 501, a lock nut 2601, and shorting plug 404. The first and second portions 501a and 501b have threaded rear sections 2605. With reference to FIG. 24, placing the first and second portions 501a and 501b about the port connector 2602 securely surrounds the port connection 2602 and allows the pieces to be placed into an opening 2701 within the equipment. Once placed into the opening 2701, lock nut 2601 may be screwed onto the rear sections of portions 501a and 501b via threads 2605 to secure the port connector and port adapter into place (see FIG. 5). Any suitable means may be used to create the opening 2701 in the equipment such as a punch or drill, and the shape of opening 2701 may vary. When the port connector 2602 is not in use, it may be plugged with shorting plug 404.

In one embodiment, the retrofit kit 2600 may include two or more wires for connecting the port connector 2602 to the appropriate circuitry within the equipment. In one embodiment, wires 2603 and 2604 may be provided for connecting to capacitor 105 within lamp fixture 108.

Below, individual components associated with the techniques of this disclosure are described in greater detail in the context of exemplary embodiments. Although not so limited, the description below focuses upon the particular embodiment of FIG. 4 in which modular lamp controller 400 uses port 401 to connect to lamp 107 through fixture 108. The capacitor 105 inside of fixture 108 is not removed or replaced. The modular lamp controller 400 is connected to the fixture 108 with flexible cable 405 and may be mounted beside lamp 107. Capacitor 416, switch 408, switch controller 412, power supply 410, and occupancy sensor 413 with optics are all inside (or, in the case of the optics, flush and integral with) the housing 407 of modular lamp controller 400.

Specialized Port

With reference to FIG. 4, a modular lamp controller 400 may utilize specialized port 401 that is installed in lamp fixture 108. Port 401 is accessible from the outside of lamp fixture 108 and has two electrical connections 402 and 403. Connections 402 and 403 are not polarity-sensitive although the port 401 may be keyed. Port 401 may connect to either shorting plug 404 or plug 406, which is attached to cable 405. In one embodiment, the connections may be made so that port 401 is in series with existing capacitor 105 in lamp fixture 108.

In one embodiment, port 401 may include electrical port connector 2602, one suitable embodiment of which is shown in FIG. 23. The exact shape of the port connector 2602 may vary, as will be recognized by those of ordinary skill in the art. Any shape suitable for providing an electrical connection point is satisfactory. In one embodiment, however, the port connector 2602 and plug 401 may have a unique pin and socket orientation. The unique orientation is not required for utility purposes, but the particular design may advantageously become associated with, or come to represent, the manufacturer. Further, the unique arrangement may be beneficial to the customer because the external port 401 of lamp 107 is used and intended for lamp control only. Port 401 may be specifically molded for this application, and the unique nature of plug 404 may therefore reduce the chance of misapplication.

An installed port 401 allows for easy "plug-in and go" installation. Fixtures 108 may be shipped with a port connector 2602 and shorting cap 404 installed by punching out a hole 2701 in an approved location. (See FIG. 24). A modular lamp controller 400 is not required to operate a lamp 107 that has port 401. A modular lamp controller 400, however, can be added and removed at anytime without interrupting the lighting of a facility or unhooking or removing any fixtures. This is possible because the connections for installing modular lamp controller 400 may be available externally to the lamp 107.

The port 401 and modular lamp controller 400 allow troubleshooting to be done without a tool. Further, one can quickly determine if a problem is associated with the modular lamp controller 400 or with the lamp 107. To troubleshoot the lamp 107 by itself, the cable 405 may be removed and the shorting plug 404 may be installed into port 401.

Figure 1:
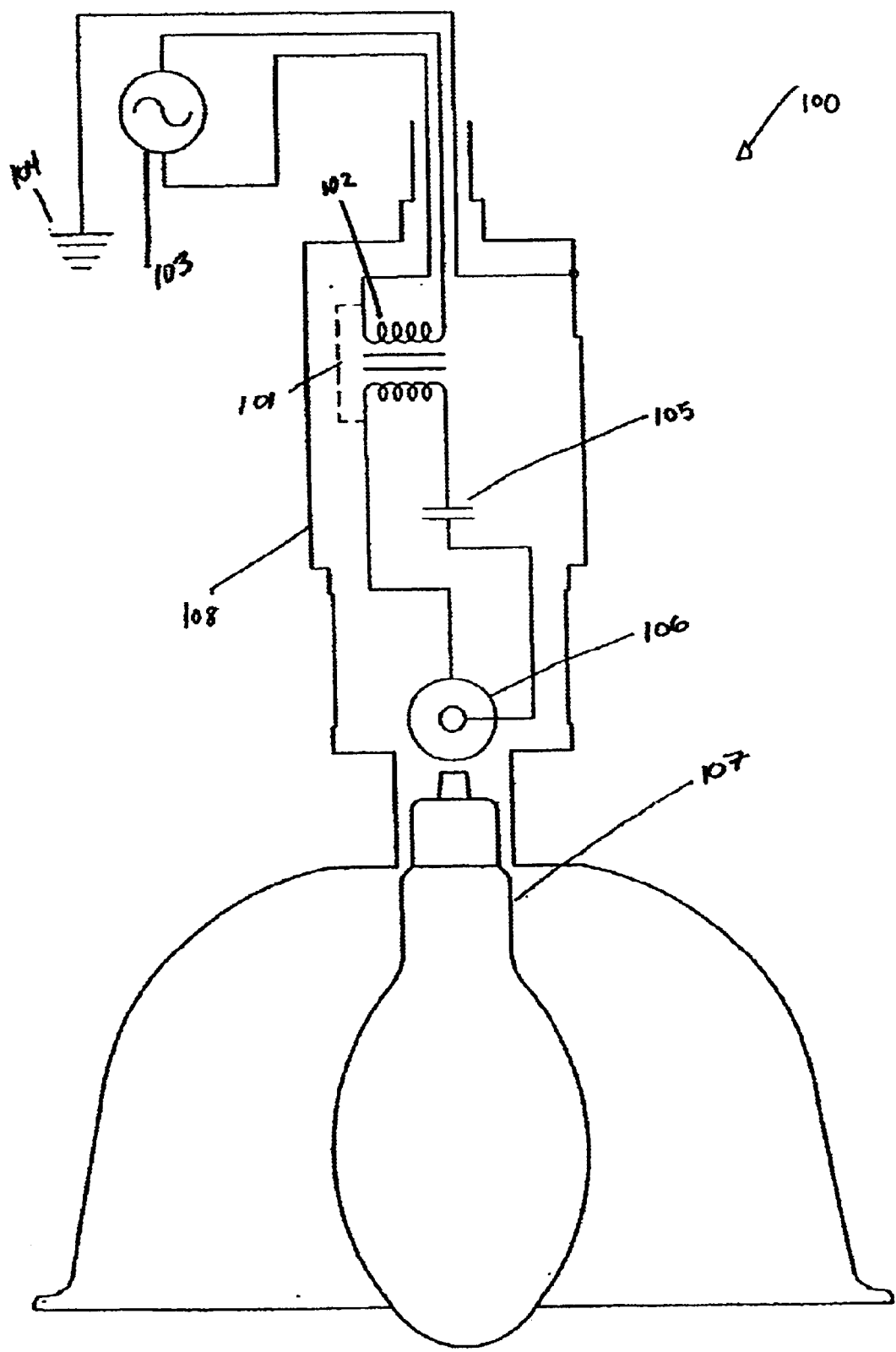
FIG. 1 is a schematic diagram of a conventional HID lamp.
Figure 2:
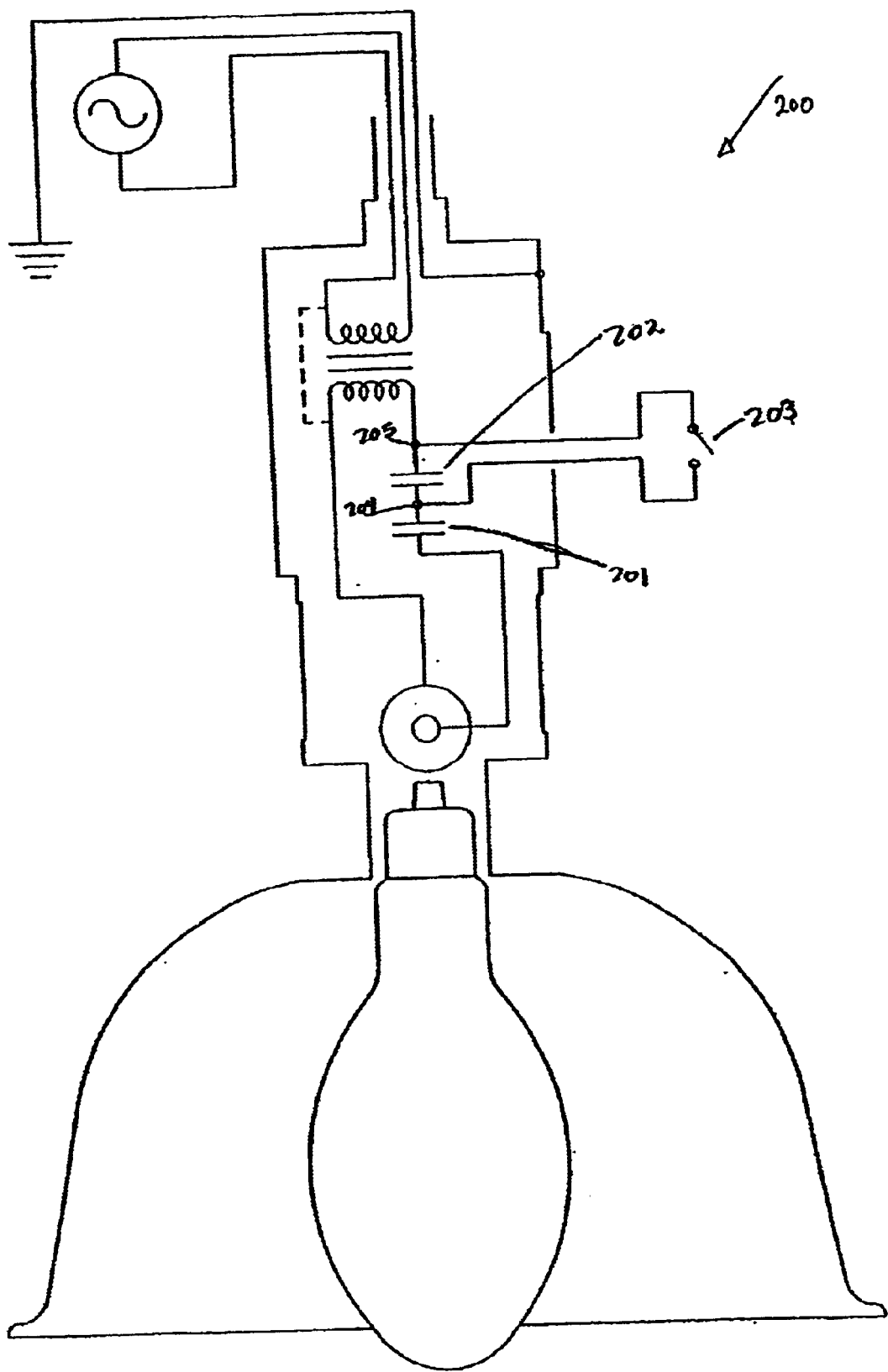
FIG. 2 is a schematic diagram of a conventional dimming system for use with an HID lamp.
Figure 3:
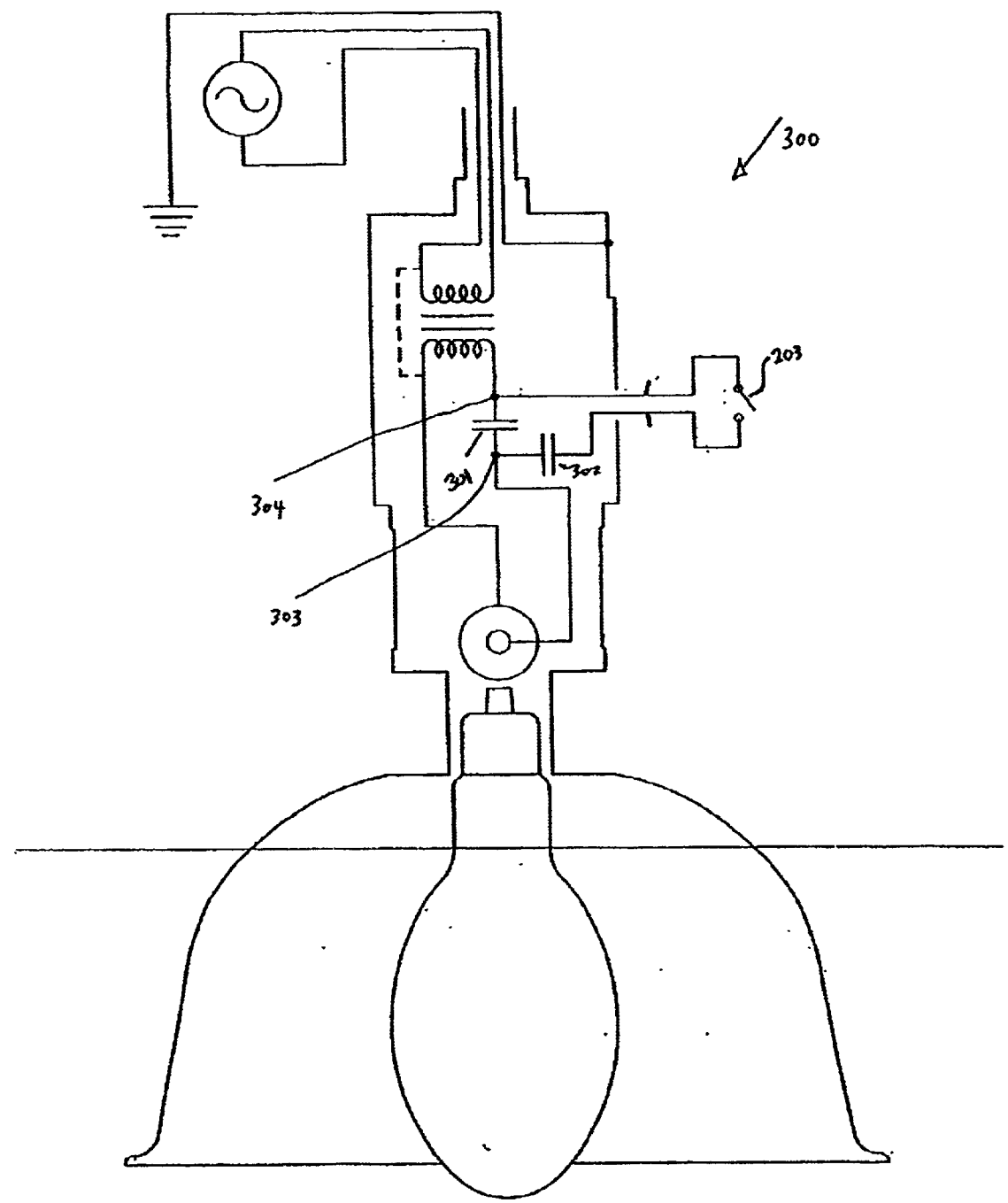
FIG. 3 is a schematic diagram of another conventional dimming system for use with an HID lamp.

Using the technology of this disclosure, the installation or removal of an occupancy sensor 413, residing within modular lamp controller 400, can be done in minutes, without a tool. Prior systems required the lamp fixture 108 to be opened and a switch hard wired. (See FIGS. 2–3 (prior art)). This was very time consuming and did not allow for quick changes in the field. It was not feasible to swap components for a troubleshooting aid without unhooking the fixture-wiring in question. Troubleshooting conventional fixtures or occupancy sensors required removing the entire assembly, which can be very costly. Further, opening the fixture cavity increases the chance for error.

Retro-fit Adapter for Creating a Port

In one embodiment, port connector 2602 and shorting plug 404 make up a unique connector system that allows the end user the flexibility to connect modular lamp controller 400. One may bypass the modular lamp controller 400 using the shorting plug 404 to run the lamp 107 standalone (at full power).

Modular lamp controller 400 generally requires port 401 to be installed in the lamp fixture 108. There are at least two ways to achieve this. If the customer is doing a new installation, the lamp 107 may come from the factory equipped with a suitable port system. A lamp fixture 108 with a hole 2701 made to fit the port 401 is shown in FIG. 4. If, however, a customer would like to install a modular lamp controller 400 using an existing fixture (that does not yet have port 401), the fixture 108 will need to be modified. A retrofit kit 2600 provides that capability (see FIGS. 23 and 24).

The installation of port connector 2602 to an existing lamp 107 in the field is straightforward using the techniques of this disclosure. In one embodiment, a retrofit kit 2600 includes several components, although it will be understood by those having skill in the art that the specific number of components may vary. The first component is a port connector 2602. The second component is the shorting plug 404. Components three and four are right and left portions 501a and 501b (here, halves) of port adapter 501. In one embodiment, there is a lock nut 2601 (which, in one embodiment may be a ¾" EMT lock nut) and two wires 2603 and 2604, one with quick connectors on both ends (2603) and the other (2604) with a quick connector on one end and the other end open.

To install port connector 2602 using the retrofit kit 2600, one first removes the lamp 107 from its mounted location. Next, the fixture housing 108 is opened and the ballast make and model may be identified. This information may be needed to specify the dimming capacitor size for the modular lamp controller 400, in embodiments utilizing capacitor 416 as a power limiting member. With fixture housing 108 open, one determines the mounting location for the port connector 2602 and then locates the wires for making the suitable electrical connections. The connector 2602 can either be located in the housing cavity or an electrical wiring box located on some fixtures.

With reference to FIGS. 23 and 24, the retrofit kit 2600 requires a hole 2701, such as a ¾" emt knockout circular hole, to be created. Opening 2701 may be either punched out with a knockout tool or drilled with, for example, a Unibit. Those of ordinary skill in the art will recognize that other ways to create the opening may be utilized as well and that the shape and size of the hole may vary.

With reference still to FIGS. 23 and 24, one places the two retrofit port adapter portions 501a and 501b around the port connector 2602 and installs the pieces into the opening 2701 (in the illustrated embodiment, a ¾" emt hole) with the interface of connector 2602 being exposed to the outside of the housing 108. After the assembly is installed into the opening 2701, one secures the port connector 2602 and port adapter 501 into position with lock nut 2601, which may be a ¾" lock nut. The port adapter portions 501a and 501b may have a rib 2603 molded into them that aids installation. The ribs 2603 allow for finger installation using the thumb and forefinger and also provide a pivot point for a screwdriver to remove the shorting plug 404 or the cable assembly 405 (and plug 406).

In one embodiment, to wire the port connector 2602 to the lamp 107, one locates the required circuit within the lamp fixture 108 and, using suitable wires (such as 2603 and 2604) either attaches using quick connects or may splice as needed with wire nuts. The wiring may mimic that shown in FIG. 4. One then reassembles the fixture housing 108 and installs the shorting plug 404. The fixture 108 is then ready to be reinstalled to its original mounting position and tested.

The shorting plug 404 allows the lamp 107 to be tested and operated without a modular lamp controller 400 installed. If lamp 107 ignites, the installation is correct and it is ready to be put back into service. In one embodiment, housing 407 provides a location for storing the shorting plug 404 when it is removed. (See FIG. 6). If the shorting plug 404 is removed from port 401 and replaced with cable assembly 405 and plug 406, lamp 107 may be operated according to the settings described herein. For example, lamp 107 may be operated in low or full power to achieve dimming of lamp 107 based upon detected occupancy.

If troubleshooting is required, the cable assembly 405 may be disconnected and the shorting plug 404 removed from the storage location (see FIG. 6) and connected to examine the operation of lamp 107 by itself. Connecting and disconnecting to the port 401 does not require lamp 107 to be removed, the fixture 108 taken apart, or the capacitor 105 in the fixture 108 removed. Lamp 107 may be operated by itself and components may be easily exchanged without moving or taking the fixture apart or changing any of the wiring. This saves much time during troubleshooting and allows one to quickly isolate components without taking them apart.

Modular Lamp Controller Cable Assembly

The modular lamp controller cable assembly 405 allows the modular lamp controller housing 407 to be mounted away from, and not rigidly mounted to, the lamp 107. This can be advantageous because of reduced temperature and proper and maintained alignment of optics for occupancy sensor 413.

Modular Lamp Controller Housing

With reference to FIG. 4, one embodiment of the modular lamp controller housing 407 contains a capacitor 416, switch controller 412, switch 408, power supply 410, and occupancy sensor 413 with optics (see, e.g., interchangeable lens assembly 1700 of FIG. 14). Capacitor 416 may be selected so that the series combination of it and the existing capacitor 105 in the fixture 108 burn s lamp 107 at low power. Advantageously, the capacitor 105 in fixture 108 does not need to be replaced, removed, or have connections changed.

Modular Lamp Controller Hardware/Circuitry

Figure 25:
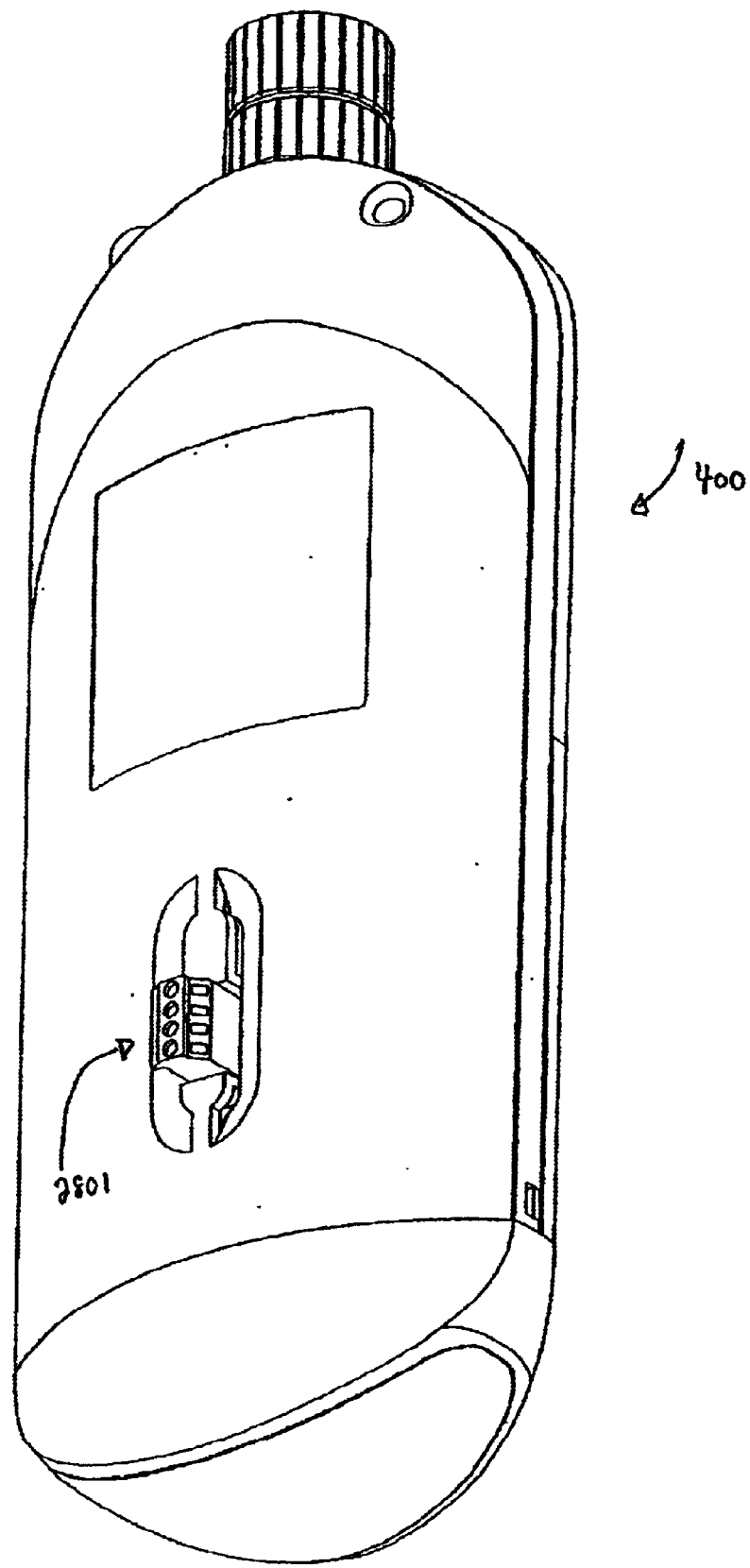
FIG. 25 is a schematic diagram illustrating a control port of a modular lamp controller, according to embodiments of the present disclosure.
Figure 26:
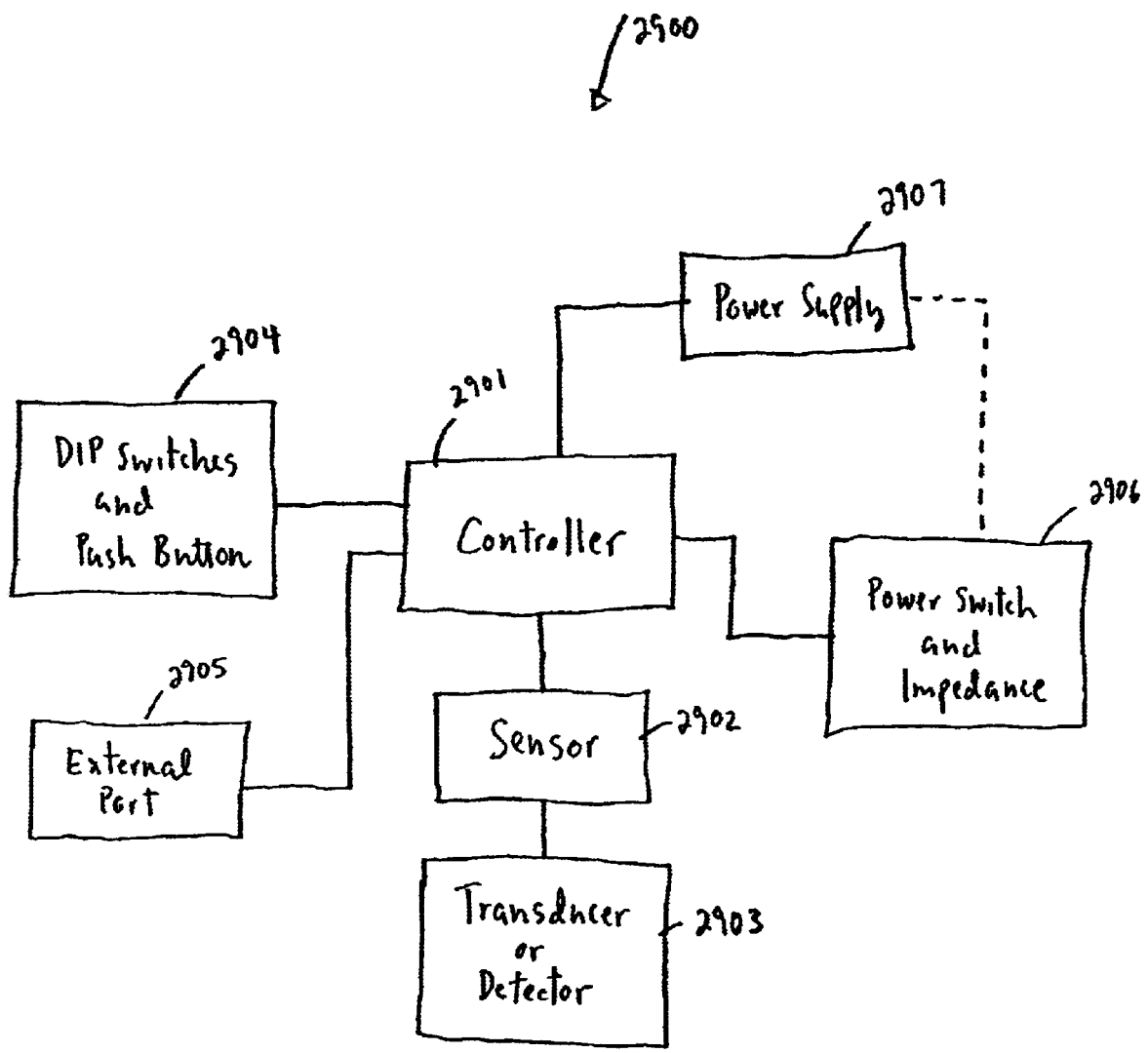
FIG. 26 is a block diagram illustrating hardware elements of a modular lamp controller, according to embodiments of the present disclosure.

FIG. 26 shows a block diagram of exemplary circuitry hardware 2900 suitable for carrying out embodiments of this disclosure. Included are controller 2901, sensor 2902, transducer or detector 2903, DIP switches and push button 2904, external port 2905, power switch and impedance 2906 and power supply 2907. Controller 2901 is coupled to sensor 2902 and transducer or detector 2903. Together, sensor 2902 and transducer or detector 2903 form an occupancy sensor, such as occupancy sensor 413. Controller 2901 is coupled as well to DIP switches and push button 2904 (pictured in FIG. 6 as 603 and 604) and external port 2905 (pictured as 2801 in FIG. 25). Power switch and impedance 2906 and power supply 2907 are also coupled to controller 2901.

In one embodiment, controller 2901 may be the commercially available MICROCHIP PIC12C67X controller, although any number of different commercially available devices may be used instead.

Modular Lamp Controller Capacitor

The series topology between capacitor 105 in lamp fixture 108 and capacitor 416 of the modular lamp controller 400, although a parallel topology may alternatively be used, is inherently safer because it is less likely that the ballast or lamp will be overdriven. An incorrect capacitor value will not run the lamp or ballast hotter. If the capacitor 416 that is installed is too small, lamp 107 will transition to too low a power and may extinguish. If the capacitor 416 is too big, lamp 107 will transition to a low power higher than possible for the lamp and energy savings will not be as great. If capacitor 416 is replaced with a short circuit, lamp 107 will burn at full power. If capacitor 416 is replaced with an open circuit, lamp 107 never arcs, but the ignitor runs on some systems. None of these situations should cause components to run at abnormally high temperatures.

Figure 6:
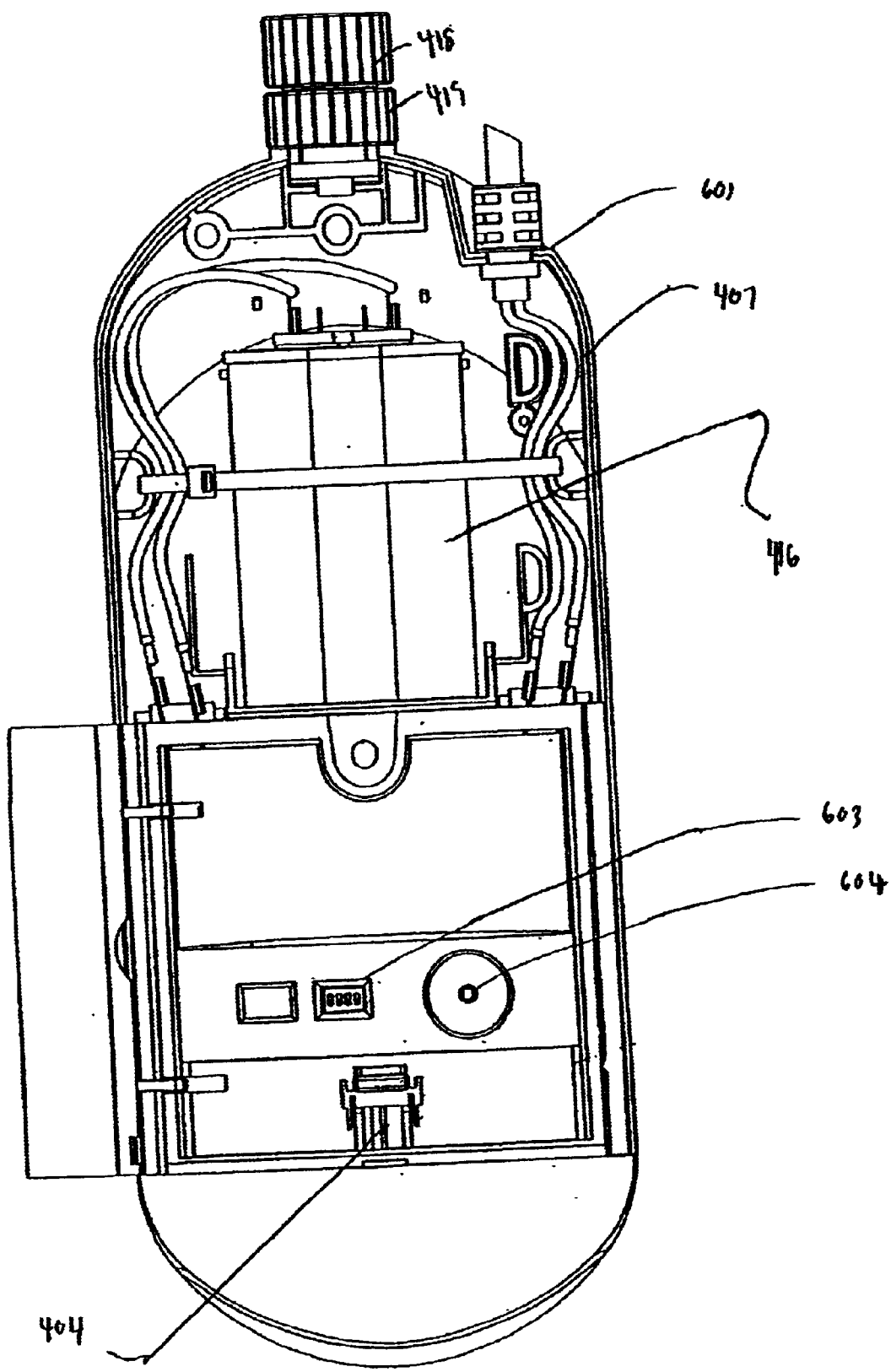
FIG. 6 is a schematic diagram showing the inside of a modular lamp controller, according to embodiments of the present disclosure.

With reference to FIG. 6, capacitor 416 is shown as a metal can, oil-filled capacitor. This is just one type of capacitor that may be used. As will be understood by those of ordinary skill in the art, one may also use plastic case dry capacitors or any other type of capacitor known in the art. The housing 407 may accommodate many different sizes of capacitors through the use of removable supports or ribs, as shown in FIG. 6. The unnecessary supports or ribs may be removed with pliers once the capacitor 416 to be used is known.

Modular Lamp Controller Switch

With reference to FIG. 4, switch 408 is in series with impedance 414 and is in parallel with capacitor 416 and impedance 415. These are in series with transformer 409 and lamp 107. When the switch controller 412 turns the switch 408 on, lamp 107 will burn at full power. When switch controller 412 turns switch 408 off, lamp 107 will burn at the low power determined by the series combination of capacitor 416 and lamp capacitor 105 of lamp 107. Impedance 415 provides a discharge path for capacitor 416, and impedance 414 may prevent high currents that could damage capacitor 416.

Modular Lamp Controller Switch Controller

One important function of switch controller 412 is the operation of switch 408. In embodiments utilizing occupancy sensor 413, switch 408 is operated based on an occupancy signal generated by the occupancy sensor 413 so that lamp 107 may be made to operate at full power when an occupant is detected within a field of view and at one or more reduced power states if there is no occupancy detected.

In one embodiment, switch controller 412 optionally has lamp current, sensor input, user input, timers and memory, and a control port available to determine the state of the switch 408. In this way, the modular lamp controller 400 may be configured to work as a group or used with external controllers and occupancy sensors, but no extra external wiring is required for single unit operation.

Since each modular lamp controller 400 may be individually powered by the current of lamp 107, there is no need for external lamp warm-up timers or external lamp dropout sensors. In one embodiment, the lamp warm-up and maintenance timers are internal to the modular lamp controller 400, so incorrect control port wiring will not adversely affect the operation of lamp 107. This also allows the use of simple controls to force to full power or to force to low power, without the concern of improper lamp operation.

Modular Lamp Controller Switch Controller—Current Sensing

The current of lamp 107 may be sensed by switch controller 412. Lamp current zero crossings may be sensed (see 411 of FIG. 4) with a time delay through the transformer 409 because it is a component that is already used and provides isolation. The lamp current can be used to verify internal timing or to determine information about lamp 107.

In one embodiment, only the zero crossings are monitored and written to part of memory. The sensing of the lamp current may be done with a resistor or some other limiting impedance and analog circuitry or an A/D converter, as understood in the art.

Lamp current may be monitored directly or indirectly. A known shunt may be placed in series with the lamp 107, and the voltage across the shunt may be measured. In one embodiment, the lamp current may be monitored by the voltage on the secondary of a transformer which has a winding in series with the lamp 107.

Modular Lamp Controller Switch Controller—Sensor Input

Switch controller 412 receives an occupancy signal, indicating the occupancy state within the coverage area of the occupancy sensor and optics, from occupancy sensor 413 so that the switch controller 412 can operate switch 408 based upon occupancy. Occupancy sensor 413 may contain one or more active and passive sensing elements. These may include, but are not limited to, acoustic transducers (audible or non-audible), light sources and detectors (visible or non-visible), and radio frequency transmitters and receivers.

An array sensitive to visible light may be used to provide information to modular lamp controller 400 about human occupancy in a space. In one embodiment, one or more video cameras may be used for occupancy detection. A potential problem with this approach, however, is that the occupant must be illuminated with visible light for the detection to occur.

An alternative to occupancy detection is to use a smaller number of elements that are sensitive to a wavelength of light that human bodies emit. In one embodiment, occupancy sensor 413 may use a multiple element pyroelectric infrared detector sensitive to light with a wavelength close to 9.4 micrometers. This wavelength may be chosen because it is approximately the specific peak wavelength of a human body. A moving human body is a moving source of light with wavelengths close to 10 micrometers. Information from a detector sensitive to this light may be used to determine occupancy in a space.

In the same manner, any characteristic of a moving human may be exploited to determine occupancy using occupancy sensor 413. Human body motion usually creates sounds which may be detected by a transducer. Human bodies usually reflect some of the sound energy that hits the outer surface. If small wavelength sounds (approximately 1 cm) are broadcast from a sensor, the reflections of these sounds off of surrounding objects (including human bodies) may be detected by a transducer. The broadcast may either be done in a pulsed or continuous manner. The detection may either be done synchronously or independently of the broadcast.

Radio frequency energy may be used in much the same way as acoustic energy. The human body absorbs and reflects radio frequency energy. The energy may be broadcast in pulses or continuously. The reflections may then be detected and used to determine occupancy using occupancy sensor 413.

Modular Lamp Controller Switch Controller—User Input

Modular lamp controller 400 may be equipped with one or more mechanisms so that a user can input or select different modes of operation of the device. The user may signal modular lamp controller 400 in many different ways. With reference to FIG. 6, the user may set dip switches 603 to effect different modes of operation. The different modes of operation may include, but are not limited to, different timer settings, sensitivity settings, and function of operation.

The dip switches 603 may be used in conjunction with the push button 604 in a sequence of different operations to place modular lamp controller 400 into different modes of operation. This allows a limited number of dip switches and push buttons to provide information limited only by the complexity of the input sequence.

In one embodiment, modular lamp controller 400 may respond to the depression of push button 604 by entering a test mode. By holding down the button 604, the user may be signaled by the lamp 107 going dim and bright again that the modular lamp controller 400 is functioning properly. The amount of time that the lamp 107 is at low power during such a test is restricted in order to not affect the warm-up of the lamp. Extended time at low power is not available while a warm-up is in progress. If the button 604 gets stuck for any reason, the modular lamp controller 400 may assume the state of the dip switches 603 before the button 604 was pushed.

This has at least two advantages over a push button override. The first is that if the push button 604 is pressed during a lamp warm-up, the time at low is limited internally to not adversely affect the warm-up. The second is that if the button 604 became stuck for any reason, the modular lamp controller 400 would revert to the settings it had before the button push.

In one embodiment, the dip switches 603 and push button 604 may all be connected through resistors to a single A/D converter pin of a processor (see FIG. 26). Such an embodiment takes advantage of the limited number of pins available on a currently-available, cost effective processors, such as the MICROCHIP PIC12C67X. Each permutation of a dip switch setting has a unique voltage range input to the A/D converter. The push button 604 may be connected so that the push button 604 produces a unique voltage range input to the A/D converter within controller 2901 of FIG. 26. In one embodiment, this allows 5 switch inputs to be read by one processor pin. When the controller 2901 reads a voltage in the range unique to the push button 604, it is considered a button press.

In one embodiment, dip switches 603 may be set to dictate a sensor time-out setting. The sensor time-out setting is the time to dim from the last motion sensed. In one embodiment, this setting is adjustable from 10 seconds to 64 minutes. In this embodiment, dip switches 603 may be set as follows to define different time-out settings ("x" represents the dip switch being "on," in an up position; "o" represents the dip switch being "off," in a down position):

| Dip switch number | 1 | 2 | 3 | 4 |
|---|---|---|---|---|
| Dim Timer | | | | |
| test (5 seconds) | o | o | o | o |
| 1 min | o | o | x | |
| 2 min | o | x | o | |
| 4 min | o | x | x | |
| 8 min | x | o | o | |
| 32 min | x | o | x | |
| 64 min | x | x | o | |

In one embodiment, dip switches 603 and one push button 604 may be used to place modular lamp controller 400 in a special factory test mode. The dip switches 603 are configured with three off and one on, as illustrated as follows and the push button 604 is pressed to initiate the test:

| Dip switch number | 1 | 2 | 3 | 4 |
|---|---|---|---|---|
| Factory Test | o | o | o | x |

When the push button 604 is pressed with the dip switches in the positions shown in the table immediately above, modular lamp controller 400 enters a factory test mode. If the dip switches 603 are in any other configuration, the button push (604) will not enter the factory test mode.

In one embodiment, dip switches 603 may be used to force the lamp 107 to a reduced power, or dim, state. This may be done by configuring dip switches 603 as follows:

| Dip switch number | 1 | 2 | 3 | 4 |
|---|---|---|---|---|
| Force Dim | x | x | x | x |

In one embodiment, dip switches 603 may be used to set the sensitivity of occupancy sensor 413. This may be done by configuring dip switches 603 as follows:

| Dip switch number | 1 | 2 | 3 | 4 |
|---|---|---|---|---|
| Low Sensitivity | | | | o |
| High Sensitivity | | | | x |

If further modes of operation are required, the number of dip switches 603 may be increased (or decreased, as needed) and/or the sequence of dip switch combinations with button pushes may be expanded. An example would be if the dip switches 603 were first placed all off, followed by a button push 604, followed by the dip switches 603 being placed all on, followed by another button push 604. This unique sequence of input could signal modular lamp controller 400 to enter a certain mode of operation.

As will be understood by those having skill in the art with the benefit of this disclosure, a variety of other functionality may be attributed to the dip switches 603 and button 604 to provide additional, optional features to modular lamp controller 400. Further a keypad or other form of input (not shown) may be configured to interface with the modular lamp controller 400, as understood in the art, to achieve even more user-input parameters.

Modular Lamp Controller Switch Controller—Control Port

In one embodiment, a control port 2801 may be made available for the user. The control port may have four electrical connection points, or pins. The control port 2801 may also have with a removable plug. The plug may have four wire screw terminals and may be keyed to mate with the control port in only one orientation. (See FIG. 25).

In one embodiment, the first connection pin is an input/output pin; the second connection pin is a force full power pin; the third connection pin is a force dim pin; and the fourth connection pin is a low voltage common reference.

The input/output pin may be internally driven to a high signal level (e.g., ~27V). The input/output pin may also be examined to determine if it is being driven high by an external source. This is useful for grouping modular lamp controllers 400 to function together.

The low voltage commons of modular lamp controllers 400 may be connected together and the input/output pins of multiple modular lamp controllers 400 may be connected together. If any one of the modular lamp controllers 400 drive the input/output pin high, all pins will be driven high. The modular lamp controllers 400 may be configured to drive the input/output pin high when occupancy is sensed and transition the controlled lamps to bright when the input/output pin is driven high. Groups of modular lamp controllers 400 configured in such a manner will all transition the controlled lamps to bright when any of them sense occupancy.

In one embodiment, the input/output pin characteristics may be compatible with the output of standard occupancy sensors so that the control wire of an occupancy sensor (which, according to manufacture may be designated by its blue color) may be connected to the input/output pin, and the ground wire of the occupancy sensor (which, according to manufacture may be designated by its black color) may be connected to the low voltage commons. This allows the occupancy sensor to affect the state of the controlled lamps. This allows extra occupancy sensors to be added to a group.

In one embodiment, the input/output pin characteristics may be compatible with the input of standard occupancy sensor power packs so that the control wire of the power pack (which, according to manufacture may be designated by its blue color) may be connected to the input/output pin, and the ground wire of the power pack (which, according to manufacture may be designated by its blue color) may be connected to the low voltage commons for the input/output pin to be able to affect the state of the relay in the power pack. This allows a single unit or group of units to control additional loads.

The force full power pin may be active when it is connected to the low voltage common pin. This allows a modular lamp controller 400 to be forced into operating lamp 107 at full power with a normally open contact. Many modular lamp controllers 400 may be connected in parallel to force them all to full power with the same contact.

The force low power pin may be active when it is connected to the low voltage common pin. This allows the unit to be forced into operating the lamp at low power with a contact. Many modular lamp controllers 400 may be connected in parallel to force them all to low power with the same contact. The modular lamp controller 400 may monitor operation of lamp 107 and not allow lamp 107 to be operated at low power during warming operations.

The control port 2801 input may be used to determine the state of the switch 408, timers, and memory. The switch controller 412 may use the control port 2801 to signal or control one or more other device. For example, energy monitors are commercially available to record the time the lamp 107 has been operating in different modes. These may be used to calculate energy savings. The modular lamp controller 400 may signal other modular lamp controllers. In one embodiment, the modular lamp controller 400 may use other two way interface means in the control port. The control port may be fitted with communications means such as radio frequency, power line carrier, infrared, sound waves, or other available method for transferring information between, to, or from modular lamp controllers.

In one embodiment, there may be a limited amount of power available at the illustrated four pin control port 2801 whenever the input/output pin is driven high. Modular lamp controllers 400 may have a module (not shown) added to the four pin control port. The module may derive its operating power from a battery or the input/output pin. The module may have access to the force bright and force dim pins of the four pin control port.

In one embodiment, if the modular lamp controller 400 is placed in a special mode of operation by a sequence of dip switch settings and button pushes, it may write to memory to always drive the input/output pin high. This will ensure power for the module as long as the lamp 107 has power. In this manner, modular lamp controllers 400 may be field upgraded without disassembly. Standard low voltage wiring may be replaced with accessory communication modules that use any other two way interface means. For example, radio frequency communication may be used.

Modular Lamp Controller Switch Controller—Timers

In one embodiment, the modular lamp controller 400 may continuously run timers to aid in monitoring external and internal states. An internal watchdog timer may be reset during normal program operation. If it is not reset properly, the modular lamp controller will be reset.

An internal clock of the modular lamp controller 400 may be scaled and used to produce registers that are updated with time values of seconds, minutes, and hours. These are useful for keeping track of timeout values specified by the user input.

In one embodiment, the zero crossings of lamp current may be monitored and compared to internal timers. This provides a check for the modular lamp controller's timer's operation. If for some reason (EMI pulse or faulty reset) the prescaler for an internal timer was to be set to an incorrect value, comparison to the zero crossings of the lamp current would result in an error, and the modular lamp controller 400 may be reset.

Internal registers and memory may be set based not only on inputs to the modular lamp controller 400, but also on the present state of these same registers and memory. If a button push test sequence has been entered, the modular lamp controller 400 will not respond to interface port commands until the button push test sequence is complete. Input values may be stored in memory to be used later by the modular lamp controller 400. For example, the signal input to the modular lamp controller 400 from the occupancy sensor 413 caused by background noise when the space is considered unoccupied may be used in an occupied state to determine modular lamp controller 400 signal input response levels.

The time that lamp 107 has been in operation in different modes may be recorded in registers. This is useful for maintaining proper lamp operation. When lamp 107 is transitioned to low power, some registers may be cleared. These registers may be incremented each second, or other increment of time, that the lamp remains in low power in a Lights Low Timer. In one embodiment, the modular lamp controller 400 may force the lamp back to a higher power state (in one embodiment, full power) for a specified time when the Lights Low Timer indicates that lamp 107 has been operating in low power in excess of a certain time. Forcing a lamp 107 that has been dim in excess of a certain time is beneficial in extending the useful life of the lamp, and especially the useful life of metal halide lamps.

Extended time at dim may cause less lumen output on some metal halide lamps. Burning the lamps at high power occasionally forces the halide salts back into the dose and out of any cool spots of the arc tube in which they might have collected. This helps preserve the tungsten electrodes, lumen output, and normal lamp operation.

In one embodiment, one may wish to avoid forcing several dim lamps to full power at the same time. For example, consider a group of lamps residing above an aisle of a warehouse. If no one has occupied that aisle in quite some time, all of the lamps would have remained dim for an excessive period. The lamps would therefore benefit from being forced to a higher power state for a period. However, if all the lamps are forced to full power at the same time, the warehouse aisle would (a) suddenly go very bright, possibly creating a distracting environment and (b) would create an undesirable spike in energy consumption.

To avoid this situation, one embodiment of this disclosure measures how long a lamp has continuously been in a dimmed state and forces that dimmed lamp to a higher power state if the timer indicates that it has been continuously dimmed in excess of a predetermined time. By "predetermined," it is simply meant that the time period is calculated or otherwise determined automatically or manually by the user. A "predetermined" time may be a random or non-random time period.

In one embodiment, a dimmed lamp may be cycled to a higher power state after a randomized, predetermined time. By way of example, if all the lights of an aisle have been dim for about 5 hours, one lamp may be forced bright at 5 hours, 2 minutes. Another lamp may be forced to a higher power after 5 hours, 8 minutes. Yet another lamp on that same aisle may go bright after 5 hours, 5 minutes. Still another lamp may have been forced to higher power at 4 hours, 58 minutes. In this embodiment, the randomized time occurs at a random time interval around a particular time (in this example, 5 hours). In other embodiments, the randomized time may not track so closely around a particular time.

In one embodiment, the determination of a randomized time is accomplished by reading the passive infrared (PIR) A/D input of occupancy sensor 413 (see 2901 and 2902 of FIG. 26) following a warm-up period instead of using a separate random number generator, which may waste needed code space or entail the use of another chip.

There is thermal noise that shows up on the PIR A/D input of occupancy sensor 413. Such noise may be filtered out before occupancy is determined. However, this noise may be used, prior to filtering and following warm-up to generate a random number. Because the noise is fairly small compared to the limits of the A/D, it mainly affects the least significant bits of the A/D read. In one embodiment, the first four least significant bits may be chosen for random number generation because it allows for 15 unique, random possibilities. As will be understood in the art, random numbers of any range (e.g., between 1–5, 1–10, 1–100, etc.) may be used as well.

The PIR circuit may take up to a few minutes to settle when power is first applied to the modular lamp controller 400 and occupancy sensor 413. Thus, the reading of the four bits may be performed when the modular lamp controller 400 exits out of its initial warm-up timer. In one embodiment, the warm-up timer may be between 12–30 minutes, however that range may vary. For example, in another embodiment, the warm up timer may be between 3–9 minutes.

Four of the eight bits may be recorded as the variable SCRAMBLE. In one embodiment, if the Lights Low Timer reaches the following value:

$$X \text{ hours} + (Y \text{ hours} * (SCRAMBLE/15)),$$

then the modular lamp controller 400 may be forced into a lamp maintenance warm-up, which means that the lamp 107 will get cycled through a higher power state, e.g., full power. In one embodiment, the input/output pin of the control port may go either high or low to initiate this lamp maintenance warm-up.

Such cycling to a maintenance warm-up after an extended period of being dim will benefit the lamp 107. In particular, it is believed that such cycling will make lamp 107 last significantly longer than a lamp that is not subject to this type of cycling. The benefit may be especially great for metal halide lamps.

As will be understood by those of ordinary skill in the art, the times X and Y listed above may be set to accommodate the particular lamps being used. This is to ensure proper lamp operation over the life of the lamp. In one embodiment, X=20 hours and Y=3.75 hours. It appears that to benefit metal halide lamps, X should be about 3 hours. The goal in one embodiment is to prevent metal halide lamps from operating in low power mode continuously for more than 5 hours.

As will be understood in the art, the variable SCRAMBLE may represent any random number lying between any range, and that number may be generated by any manner known in the art. Likewise, the variable SCRAMBLE may be multiplied or divided by different constants (or no constants) as desired.

In general, lamp 107 may be cycled by first timing how long the lamp has been in a dimmed state. In one embodiment, this time is stored in a lights low timer, and the time itself may be referred to as the lights low value. The lamp may then be forced to a higher power state (e.g., full power) when the lights low value exceeds a predetermined time. The predetermined time may be set manually or automatically. It may be a fixed constant time, a changing time, a random time, a time following a certain pattern or trend, or any other time period. A predetermined time may be chosen to particularly benefit a certain type of lamp. For instance, if one type of lamp benefits by not being continuously dim for more than 2 hours, the predetermined time may be a time period around 2 hours. After the lamp is forced to a brighter state, it is returned to a dimmed state (the identical dim state prior to going bright or a different dimmed state) after a second predetermined time. Like the first predetermined time, the second predetermined time is not limited to a certain value or type of time period. Rather, it may a fixed constant time, a changing time, a random time, a time following a certain pattern or trend, or any other time period. It may be set manually or automatically.

In general, the predetermined time at which the lamp is forced to a higher power state may be a randomized time. By "randomized," it is simply meant that the predetermined time may have some random element. In other words, the predetermined time may vary in a way following no specific pattern. In one embodiment, the randomized time may constitute a random time added to a fixed period of time. In another embodiment, it may be represented by X+Y* (RANDOM/15), where X is a fixed period of time, Y is a multiplier, and RANDOM is a random number between 1 and 15. In yet another embodiment, it may be a random time subtracted from a fixed period of time. In still another embodiment, it may be a random multiplier of a fixed period of time. The random element of the randomized time may be generated by any of numerous methods known in the art for generating a number following no specific pattern. In one embodiment, a random number generator may be used. In another embodiment, the random element may be obtained from one or more bits of an occupancy sensor, as discussed above in the context of a specific embodiment.

In one specific embodiment, the randomized time may be represented symbolically as follows:

$$T = T_f(\text{Operator})T_r$$

where T is the time at which a dimmed lamp is forced to higher power; $T_f$ is some fixed period of time; (Operator) is any mathematical operator including but not limited to addition, subtraction, multiplication, exponential, etc.; and $T_r$ is a random time (or a random scalar). As will be understood by those of ordinary skill in the art, $T_r$ need not be a "bare" random number—rather, it may be a random number multiplied, divided, added to, subtracted from, raised to a power, etc. of a constant or other factor.

Modular Lamp Controller Switch Controller—General Operation

Figure 7:
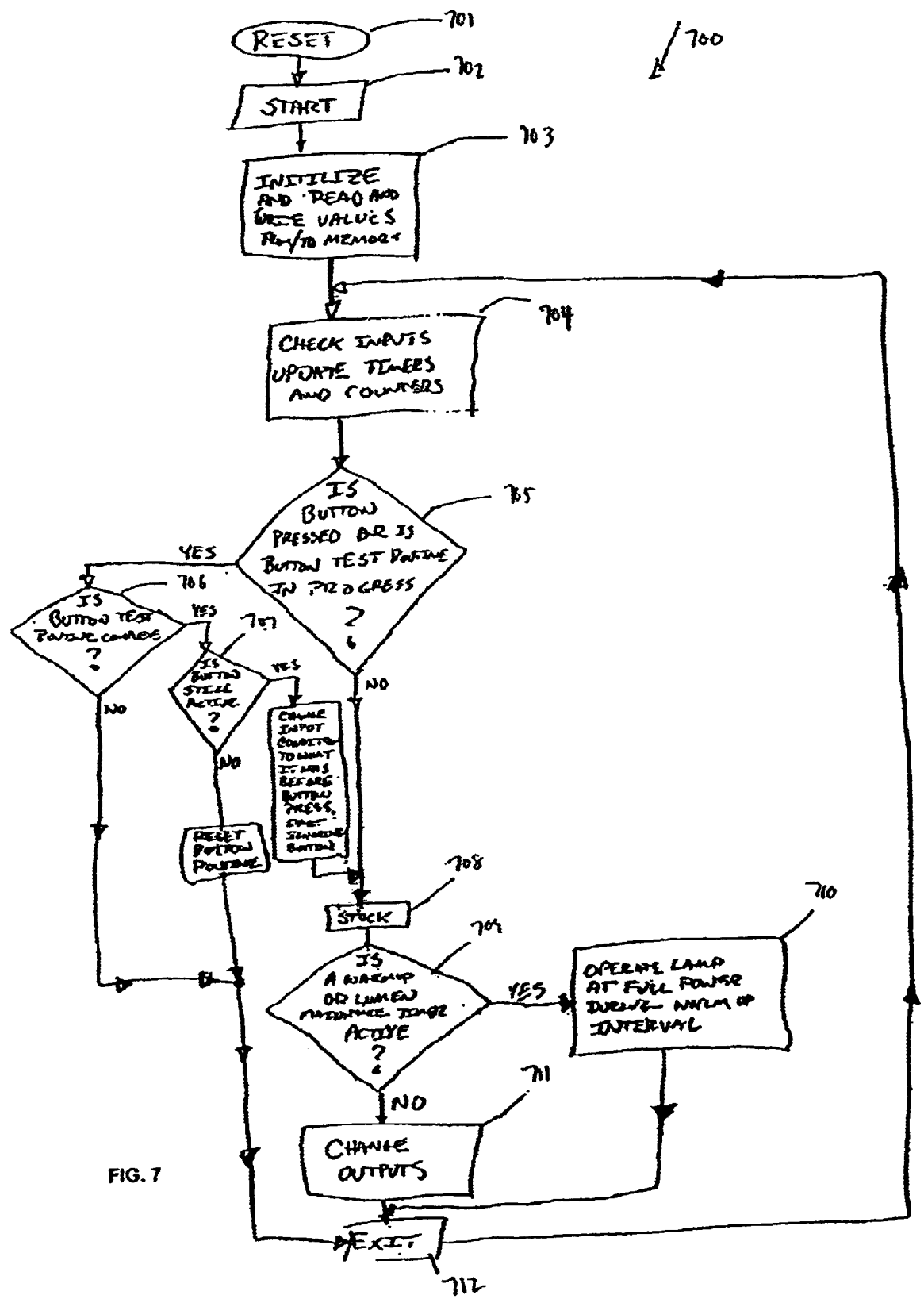
FIG. 7 is a flowchart illustrating processes for operating a modular lamp controller, according to embodiments of the present disclosure.
Figure 8:
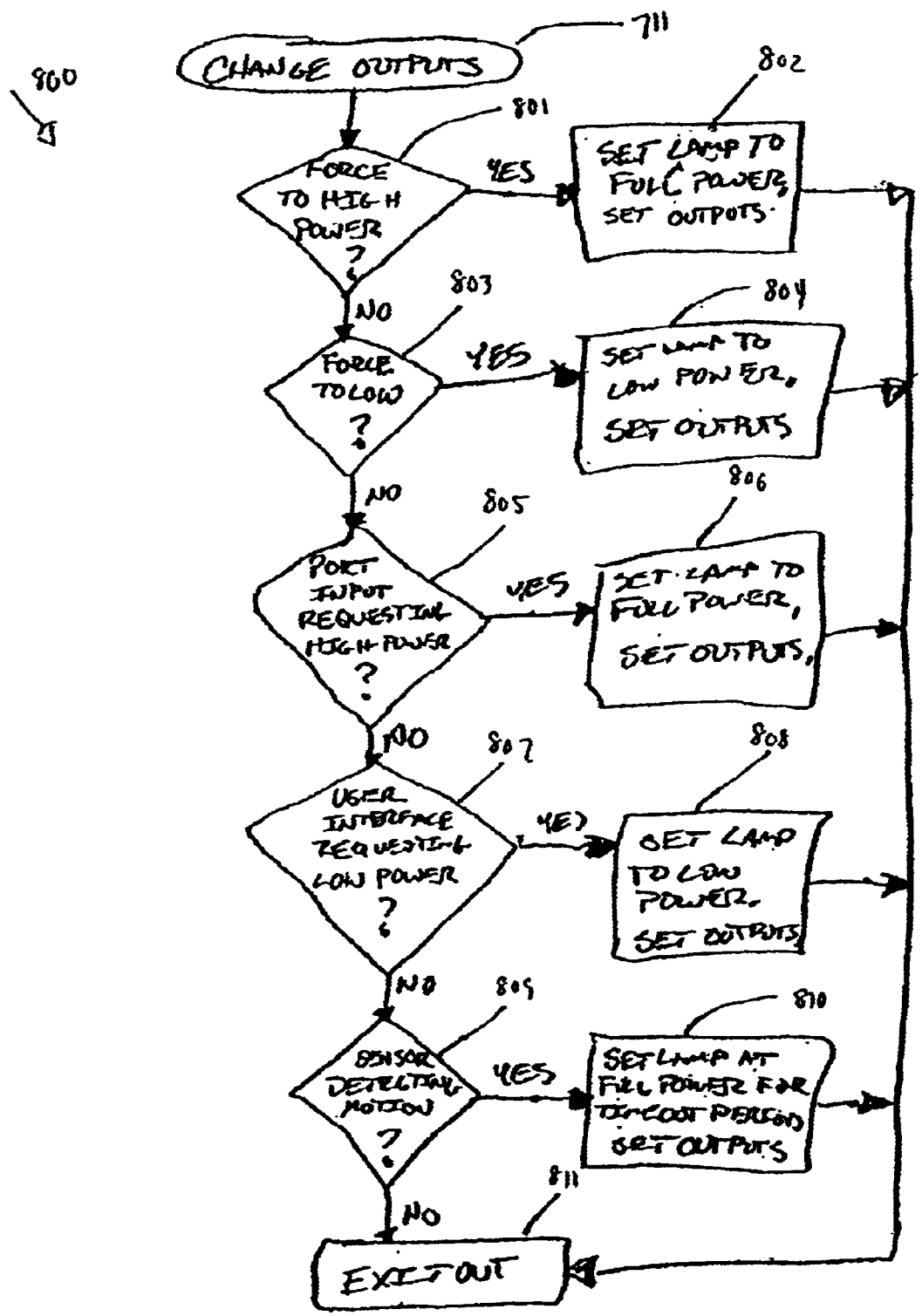
FIG. 8 is another flowchart illustrating processes for operating a modular lamp controller, according to embodiments of the present disclosure.

FIGS. 7 and 8 map out a scheme for switch controller function. In practice, the functions disclosed in the flowcharts of FIGS. 7 and 8 may be programmed into a program memory so that a processor causes switch controller 412 to perform the functions according to the present invention. In particular, the functions disclosed in FIGS. 7 and 8 may be performed by system 2900 of FIG. 26.

With reference to FIG. 7, the chart 700 starts at RESET (701) and proceeds to START (702). Values are read from memory and timers and counters are initialized and started during INIT (703). CHECK INPUTS (704) reads all of the inputs and updates timers and counters. The decision block (705) uses the information collected in CHECK INPUTS (704) and internal memory to determine if a test button (such as button 604)or test button routine is activated. If either is activated decision block (706) determines if the test button routine is completed. If the test button routine is not started or finished, control passes to exit block 712 with an active test button routine.

If the test button routine is completed, decision block 707 determines if the button 604 is still activated. An activated button indicates that the button is stuck. The user input will be changed to the value it was prior to the button push and control passes to STUCK (708). If decision block 707 determines that the button is not active, the button test routine may be reset and control passes to exit (712).

If 705 determines that the test button 604 and test button routine are inactive, control passes to STUCK (708) and to decision block 709. Decision block 709 checks to see if there is an active warm-up or lumen maintenance warm-up. If there is an active warm-up, control passes to block 710, where the lamp 107 is forced to full power and outputs changed if necessary.

If there is not an active warm-up or lumen maintenance warm-up at block 709, the control passes to CHANGE OUTPUTS (711).

FIG. 8 describes a scheme for CHANGE OUTPUTS 711 of FIG. 7.

CHANGE OUTPUTS 711 starts at 711 of FIG. 8 and control passes to decision block 801. If there is a command to force the lamp 107 to high power, control passes to block 802. Block 802 transitions the lamp 107 to high power and changes any other necessary output or internal settings before proceeding to EXIT OUT 811.

If there are no force to high power commands at 801, 803 checks if there is a force to low power. If there are any, block 804 sets the lamp 107 to low power and changes any other necessary output or internal settings before proceeding to EXIT OUT 811.

If there were no force to low power commands at 803, 805 checks to see if the input/output pin of control port 2801 is active. If the input/output pin is active, there is an external device requesting that the lamp 107 be operated at full power, and block 806 sets the lamp 107 to full power and changes any other necessary output or internal settings before proceeding to EXIT OUT 811.

If the input/output pin of port 2801 is inactive at 805, 807 checks to see if the user interface (e.g., dip switches 603) has a force to low power. If it does, block 808 sets the lamp 107 to low power and changes any other necessary output or internal settings before proceeding to EXIT OUT 811.

If the user interface did not have a force to low power at 807, 809 checks to see if the occupancy sensor 413 indicates that the space is occupied. If it is, block 810 sets the lamp 107 to full power and changes any other necessary output or internal settings before proceeding to EXIT OUT 811.

If the space is unoccupied at 809. control passes to EXIT OUT 811.

Modular Lamp Controller Power Supply

In one embodiment, power supply 410 for use with the modular lamp controller 400 uses a small impedance in series with the lamp 107 to provide power. Providing power to the modular lamp controller 400 from the current of lamp 107 has several benefits. For example, the modular lamp controller 400 will only be timing the lamp current warm-up while the lamp has current to warm it up and no external power connection is required. Nevertheless, it will be understood that a separate power supply, which does not draw power from the lamp 107, may be used as well.

Modular Lamp Controller Occupancy Sensor and Optics

In one embodiment, occupancy sensor 413 may be included in the housing 407 of modular lamp controller 400 so that a separate sensor doesn't need to be connected for control by occupancy. This greatly reduces any possibility of a bad connection between the occupancy sensor 413 and the modular lamp controller 400 occurring during installation When the occupancy sensor-to-switch ratio is increased, the amount of coverage required per sensor is reduced. When the required coverage is reduced, the probability of occupancy is lower. If each lamp 107 is controlled independently, the overall energy consumption should be less. In sum, more sensors to switches means more savings.

Interchangeable Lens Assembly

In one embodiment, a modular lamp controller 400 may be equipped with an interchangeable lens assembly 1700, which may be an interchangeable passive infrared (PIR) lens assembly. Use assembly 1700 provides for an easy and affordable system to retrofit occupancy sensors 413 in the field or troubleshoot systems without requiring the use of tools.

In the past, replacing a PIR lens would involve removing an occupancy sensor from its current location and disassembling it. This is a very time consuming process and also opens up the chance for errors. In conventional sensor systems, the PIR lens is fixed, and there is no replacing the lens. Rather, one is required to purchase a complete new sensor assembly. In the past, there was no real easy way to clean the lens if it became dirty. This, in turn, would directly affect the performance of the sensor. Along the same lines, it was very difficult to troubleshoot occupancy sensors. Problems include occupancy sensor malfunction, damaged or dirty lens, incorrect lenses for the application, or misaligned lenses. Another problem with existing occupancy sensors is that if you wanted to change the layout of the sensor pattern, again you either disassembled the sensor or purchased a new one.

Figure 15A:
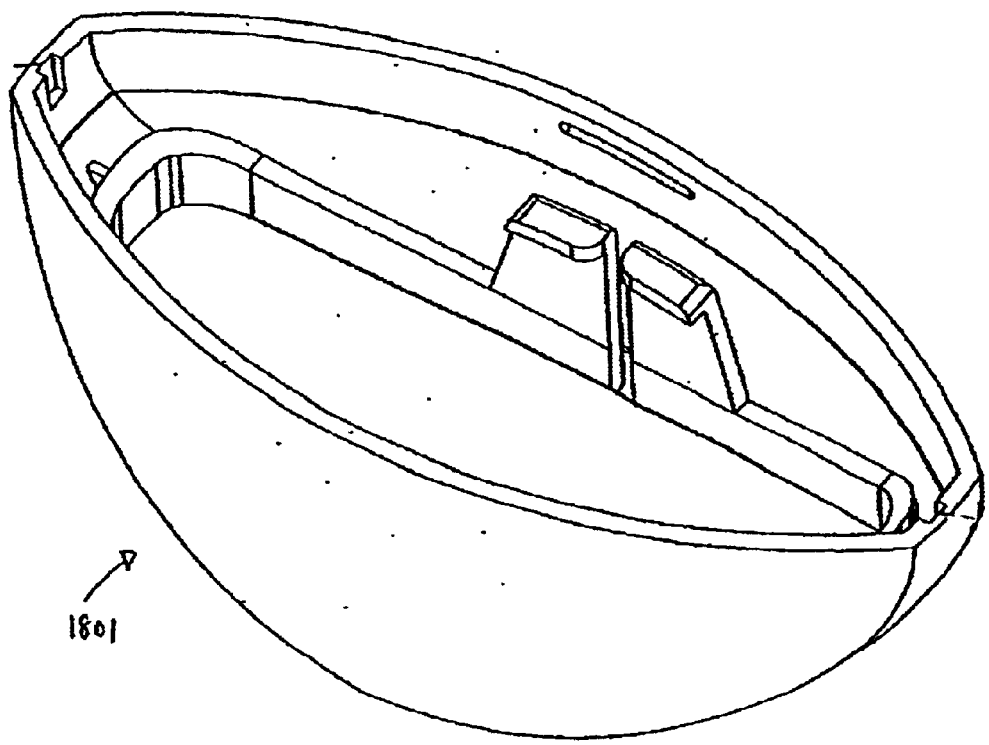
FIGS. 15A and 15B are a schematic diagrams showing different views of an assembled interchangeable lens assembly unit for use with a modular lamp controller, according to embodiments of the present disclosure.
Figure 15B:
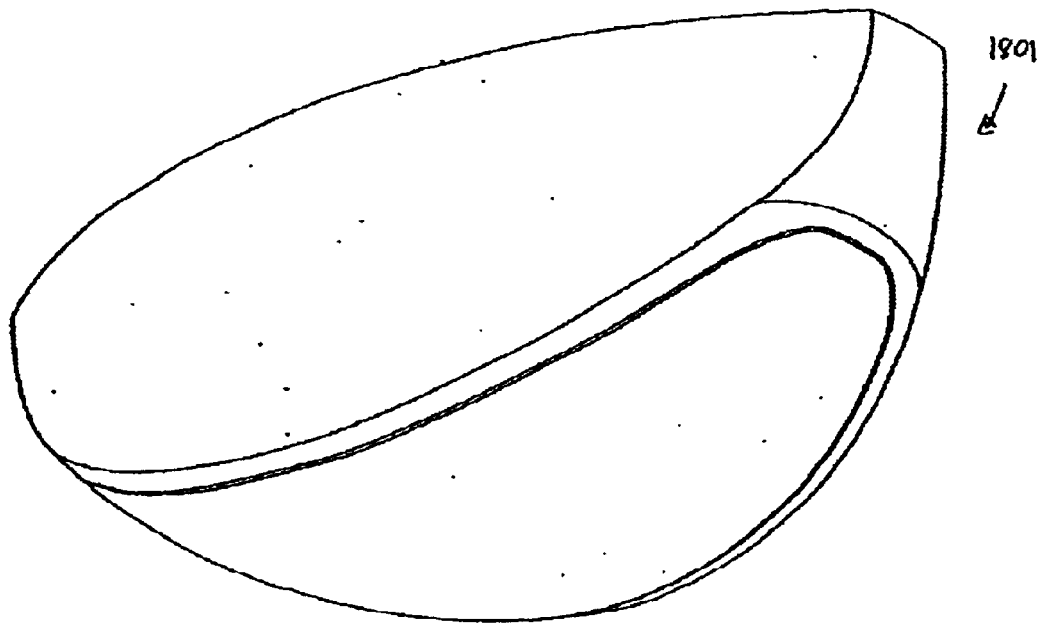
Figure 16:
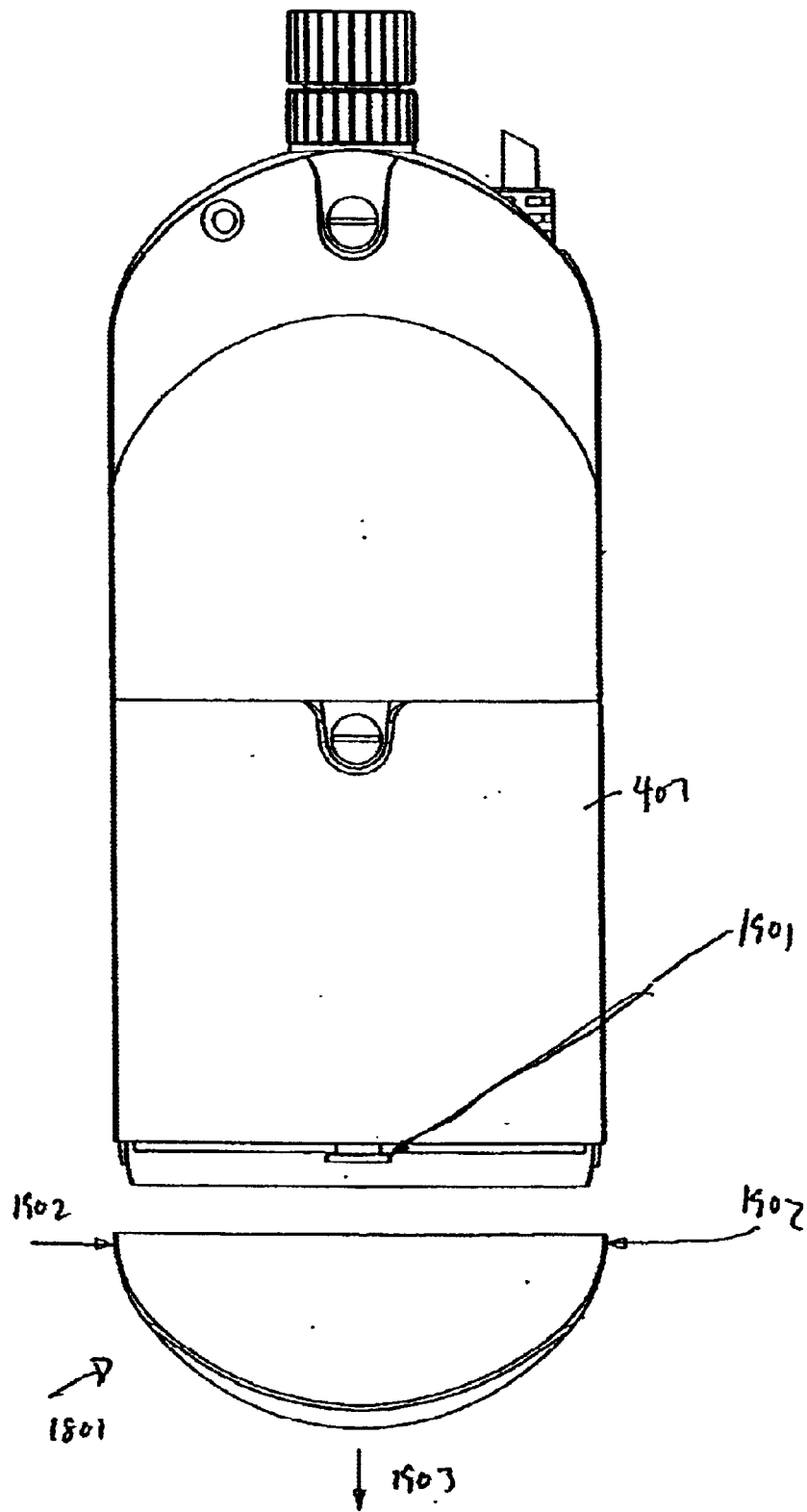
FIG. 16 is a schematic diagram showing the attachment of an interchangeable lens assembly unit to a modular lamp controller, according to embodiments of the present disclosure.

With reference to FIGS. 14–16, embodiments of the lens assembly 1700 may include the following main parts: the lens housing 1702, the lens retainer 1701, and the lens 1703. Assembled so that the lens retainer 1701 and lens 1703 are placed in the housing 1702, the interchangeable lens assembly becomes an integral unit 1801. (See FIGS. 15A and 15B). The lens assembly 1700 may be a standalone unit 1801, but when snapped on to a modular lamp controller housing 407 (see FIG. 16) it becomes an integral part of the modular lamp controller 400 and housing 407, providing structural strength as well as completing the esthetics.

The lens assembly 1801 also provides the optics for the occupancy sensor 413 and protects the PIR detector (or other occupancy detector) from radiated energy (light and heat) and convection. The protection thus provided greatly reduces the background noise of the detector. Many different lens patterns may be used (see, e.g., FIGS. 18A–21B), and it will be understood by those of ordinary skill in the art that the options for such patterns are endless. The capability to switch out the lens 1703 (or the entire unit 1801) in the field without tools and without having to remove the occupancy sensor 413 represents a great advantage over existing, conventional systems. Further, the interchangeable lens assembly 1700 provides a way to examine an occupancy sensor 413 for incorrect lenses, dirty lenses, and damaged lenses with out removing the occupancy sensor 413, which represents another great advantage.

The interchangeable lens system 1700 is easy to use. The first requirement is to decide which lens patterns will best fit the application (FIGS. 18A–21B). After the lens 1703 has been selected, one simply aligns the assembled lens assembly 1801 with the bottom of the modular lamp controller housing 407 (see FIG. 16) and pushes up until the lens assembly 1801 snaps onto the modular lamp controller housing 407. To remove the assembly, one may press in (see elements 1902) and pull down (see element 1903). The lens assembly may be keyed (see 1704 and 1705) so that there is a front and rear to the unit.

Figure 17:
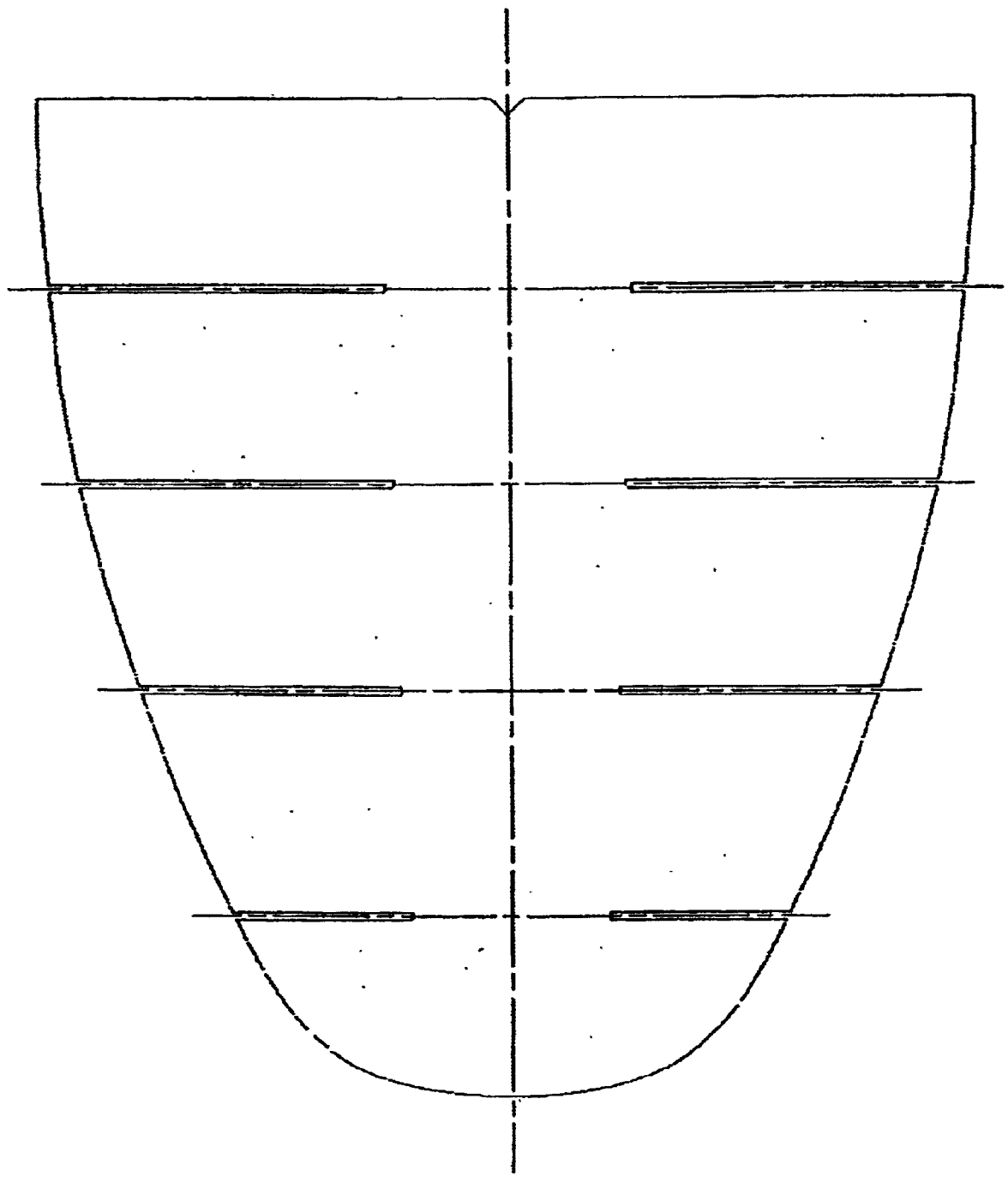
FIG. 17 is a schematic diagram illustrating a masked lens for use with an occupancy sensor of a modular lamp controller, according to embodiments of the present disclosure.
Figure 18A:
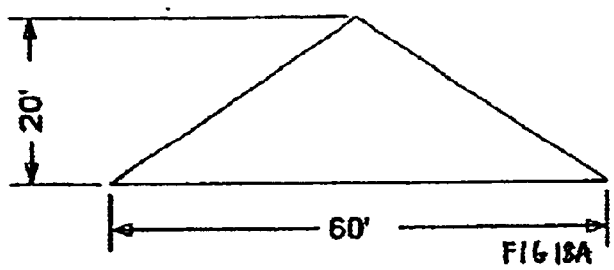
Figure 18B:
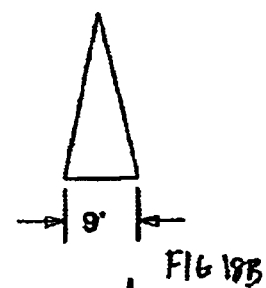
Figure 19A:
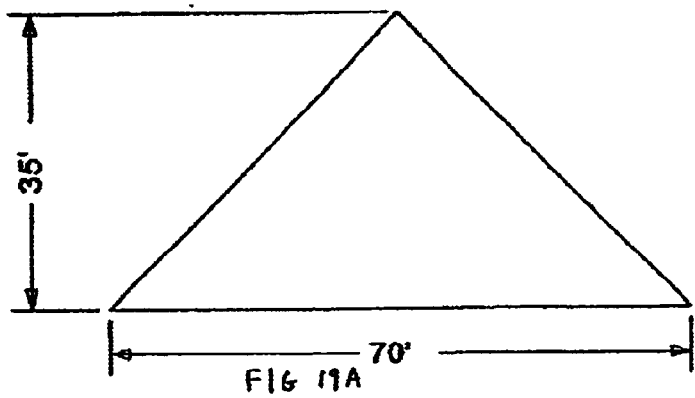
Figure 19B:
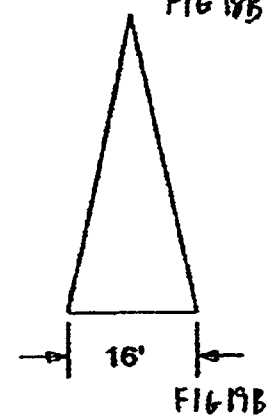
Figure 20A:
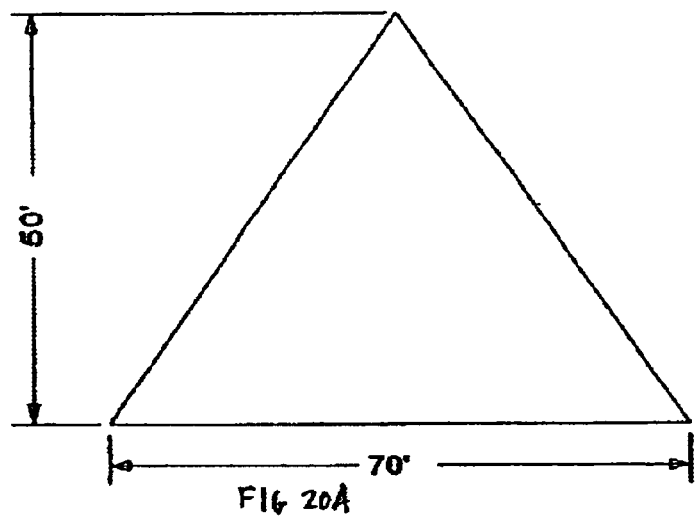
Figure 20B:
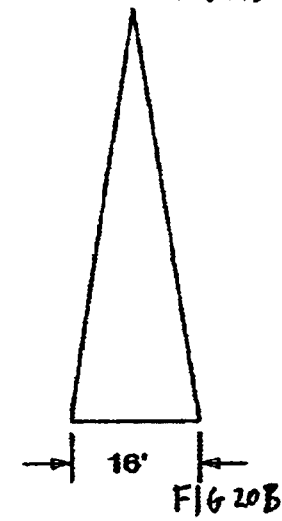
Figure 21A:
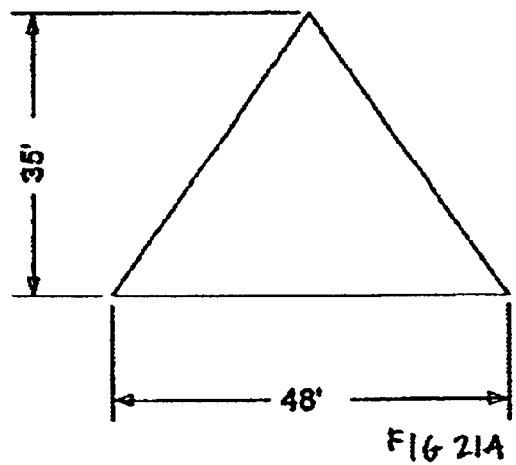
Figure 21B:
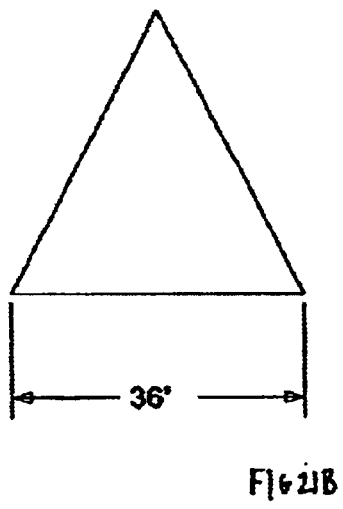
Figure 22:
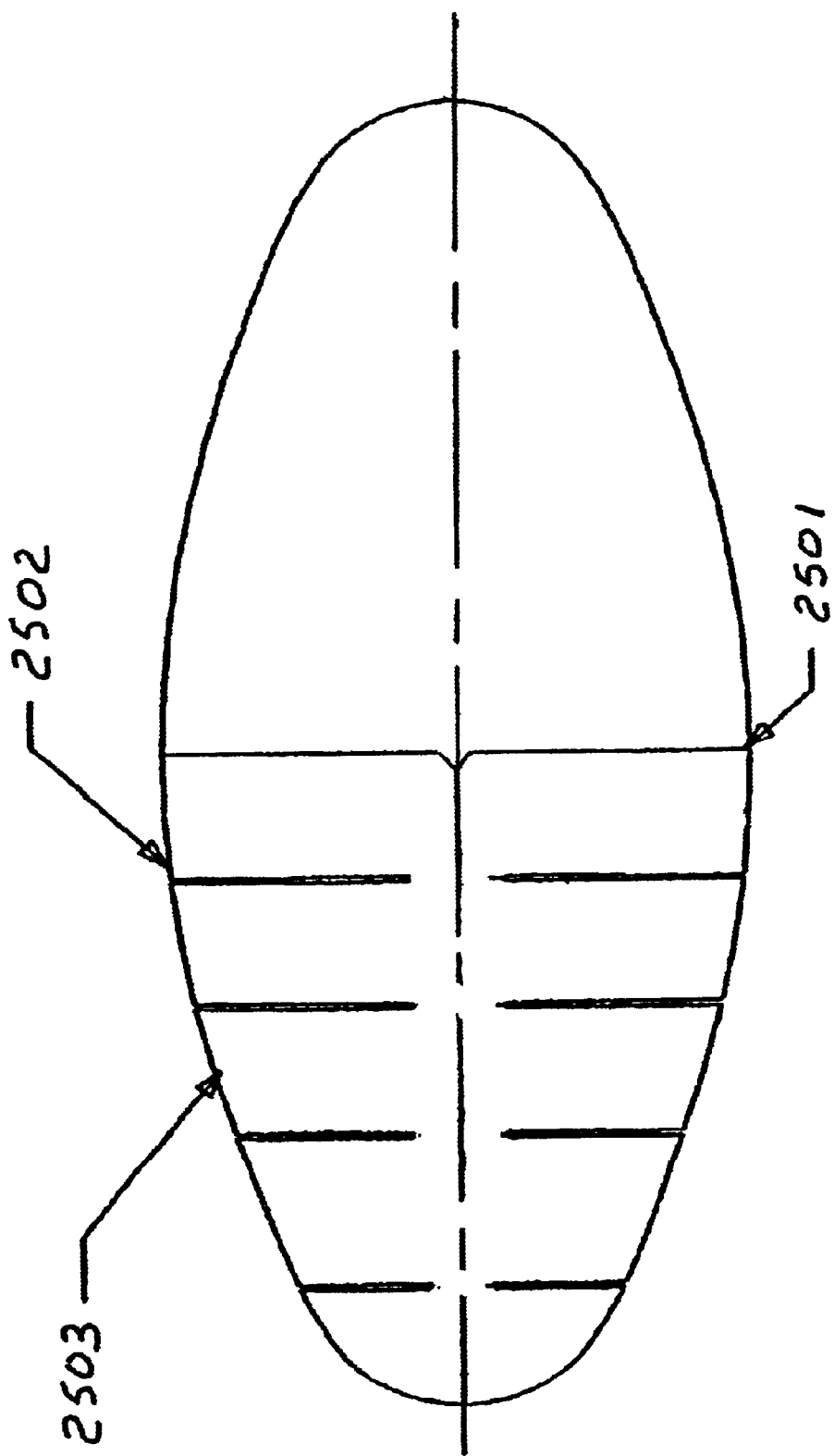
FIG. 22 is a schematic diagram illustrating another masked lens for use with an occupancy sensor of a modular lamp controller, according to embodiments of the present disclosure.

This keyed feature allows for masking of the lens (see FIGS. 17, 22). FIGS. 17 and 22 show a possible lens mask. With reference to FIG. 22, lines 2503 represent facets, and 2502 represents cut profiles and slots. Depending on the location, various lenslets may need to masked off from the lens' line of sight. Cuts in the mask pattern not only allow for masking of individual parts or groups of parts of the lens, but they also allow the mask to contour to the shape of the lens. Any other type of masking known in the art may also be used in conjunction with interchangeable lens assembly 1700.

The lens 1703 is not necessarily a regular shape like a cylinder. The mask pattern should be fabricated to provide an opaque cover that fits the unique lens contours. This allows the end user to create custom patterns for specific applications. By masking, one can select areas of unwanted detection and help eliminate false triggers. After the unit 1801 is installed, one may attach a laser alignment tool, described immediately below, and align the occupancy sensor 413.

Laser Alignment Tool

In one embodiment, a laser alignment tool (LAT) 1400 may be provided that affords a simple and accurate way to adjust and align occupancy sensor 413.

In the past, aligning an occupancy sensor was very tedious and unreliable. The only real way to align an occupancy sensor was by trial and error. Most applications require the installer to be elevated above the floor in order to install the occupancy sensor. Mounting heights of 60 feet are not out of the ordinary. This means that every trip up and down from the occupancy sensor may take a nontrivial amount of time. Once the installation is complete, installers now usually make their best judgment as to the aiming of the sensor. At this point, there is only two ways to verify the alignment. The installer must get down to the floor and walk-test the sensor or wait while a second person already on the floor performs a walk-test. A walk-test consists of walking in and out of the desired coverage area to determine if the sensor detects motion only in that area. If the sensor detects motion in undesired areas or does not detect motion in desired areas, the sensor must be adjusted and tested again. This very inaccurate and time-consuming method must be repeated for each conventional occupancy sensor.

Figure 13A:
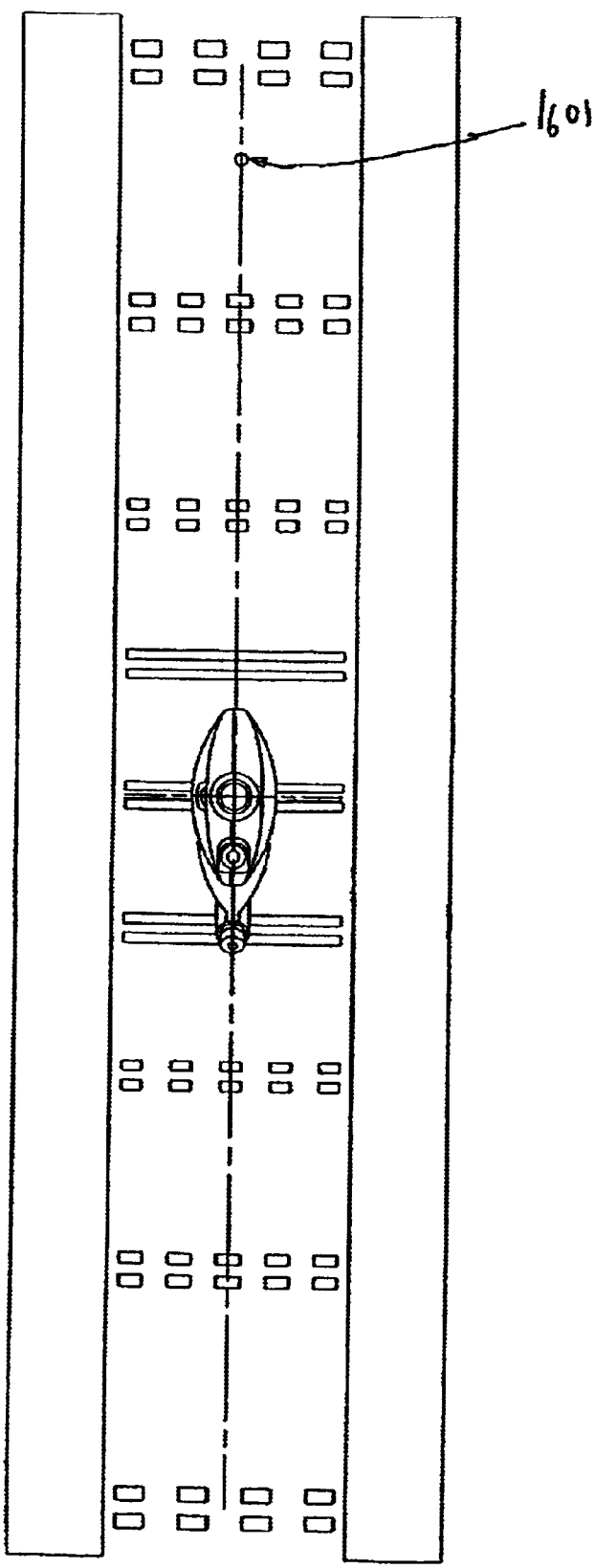
FIGS. 13A and 13B illustrate alignment principles of a laser alignment tool, according to embodiments of the present disclosure.
Figure 13B:
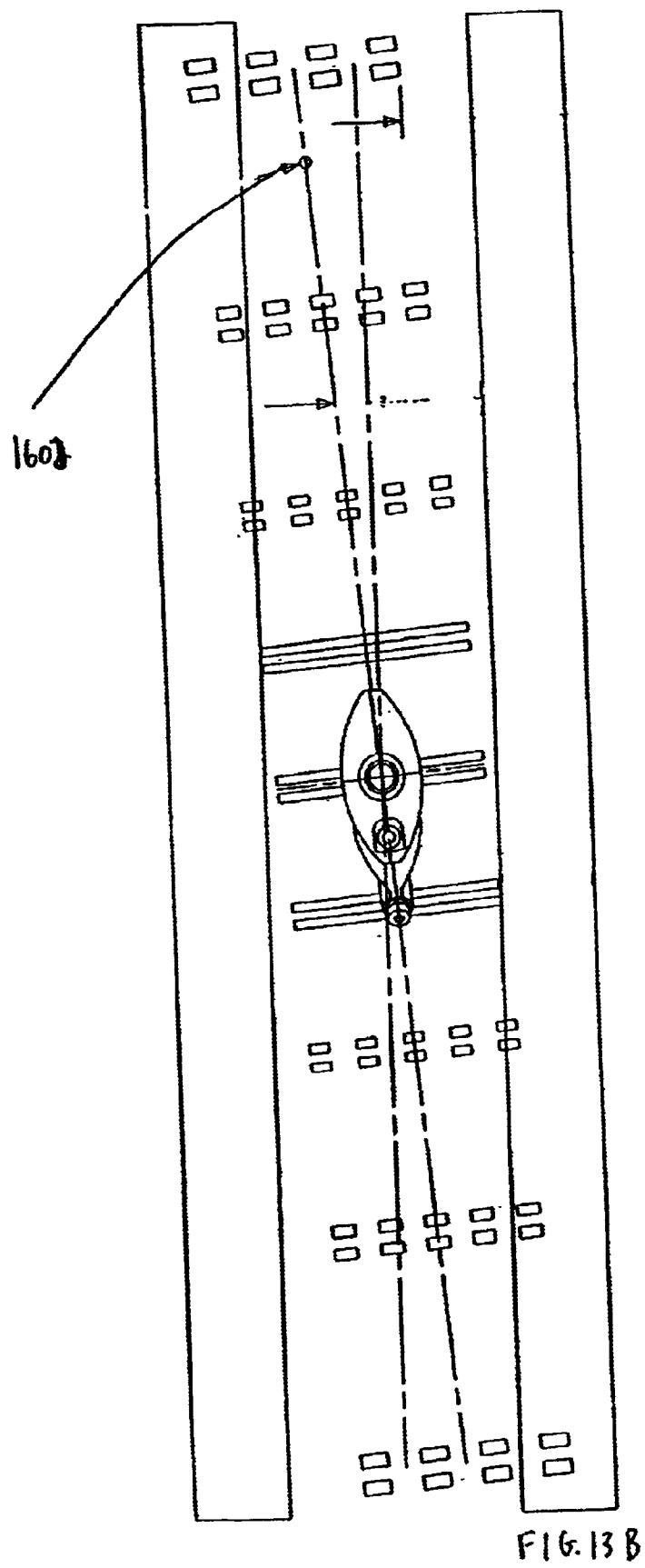

The large mounting heights make accurate sensor placement critical to good performance. It takes very little adjustment at the sensor (single degrees) to move the pattern on the floor by feet. An example of a properly aligned sensor and coverage pattern is shown in FIG. 13A. An example of the same sensor and coverage pattern miss-aligned by a couple of degrees is shown in FIG. 13B.

With reference to FIG. 11, Laser alignment tools (LATs) 1400 of this disclosure are designed to provide an accurate method of aligning an occupancy sensor 413 in a relatively short time. In one embodiment, the LAT 1400 includes a precision molded bracket 1404 and a commercial grade laser 1405. The molded bracket 1404 is designed to clip on and precisely cradle around the housing 407 without the use of any tools. In one embodiment, the clip 1403 of the molded bracket 1404 is inserted into recess 1401 and rotated 90 degrees. This secures the LAT 1400 to the housing 407. In other embodiments, rotation may not be necessary or may be less than or greater than 90 degrees.

Another feature of the molded bracket 1404 of the illustrated embodiment is that it is designed to fit precisely around the contour of the housing 407. Arms 1402 accomplish this in the illustrated embodiment of FIG. 11. Laser 1405, which may be a commercial grade laser but may be any laser suitable to shining an accurate point of light, may be mounted in the molded bracket 1404 at a 45 degree angle and calibrated to be in the same axis as the bracket 1404. Those of ordinary skill in the art will recognize, however, that any other angle may be used and the LAT 1400 may be mounted on a different portion of the modular lamp controller 400 (or integrated with the modular lamp controller). The combination of these features gives the installer a very fast, simple, and accurate method of aligning the sensor without ever leaving the initial installation location.

Figure 12:
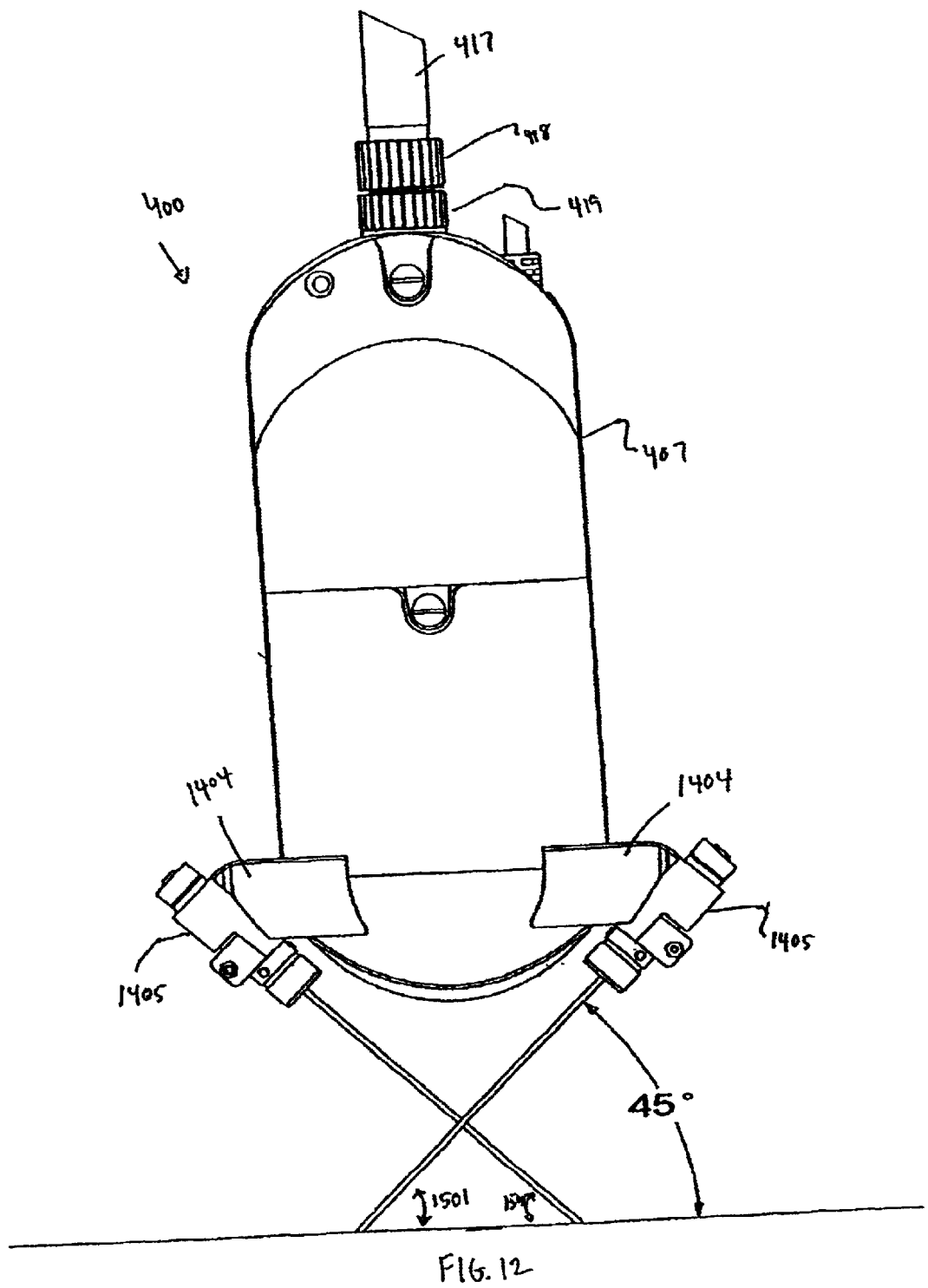
FIG. 12 is a schematic diagram illustrating a modular lamp controller equipped with two laser alignment tools, according to embodiments of the present disclosure.

A typical sensor alignment procedure according to embodiments of this disclosure starts with clipping the LAT 1400 onto a pre-mounted modular lamp controller 400 equipped with an occupancy sensor 413. The laser 1405 is activated by pushing the maintained on/off button 1407 at the back of the laser. This will project a laser dot image on the floor in line with the main axis of the sensor (see FIGS. 13A and 13B). The unit 400 may then be rotated about the mounting adapter (503 of FIG. 5) until the laser dot is projected in the middle of the isle or in line with any predetermined target (FIGS. 13A and 13B). When the sensor is oriented correctly, one simply tightens the jam nut 419 and locks the modular lamp controller 400 in position. Depending on location, one may need to cross check the alignment by using a second LAT 1400 mounting feature (FIG. 12). In FIG. 12, although the two LATs are shown with a 45 degree angles 1501 and 1502, it will be understood that any other angle may be used. Other embodiments may utilize one (or zero, if laser alignment is not needed) LATs 1400, as desired.

The housing 407 may be designed with a second LAT 1400 mounting feature, which in one embodiment may be 180 degrees from the original mounting feature (FIG. 12). By cross checking, the installer can (a) verify that the modular lamp controller 400 is plumb with the floor and make adjustments if necessary and (b) be confident that the modular lamp controller 400 is aligned correctly without ever leaving the installation location. There are various mounting applications were the modular lamp controller 400 may be mounted too close to something like a beam, column, or wall and one of the LATs 1400 would not be accessible.

Mounting Adapter Assembly

In one embodiment, and with reference to FIGS. 9 and 10, a mounting adapter assembly 1200 may be utilized to mount a modular lamp controller 400. The mounting adapter assembly 1200 is a system to mount, align, and lock into position without requiring the use of a tool.

In the past, occupancy sensor mounting and alignment was difficult and time consuming. It was difficult because the preferred mounting location was on the lamp fixture 108. The most common place for mounting was the lamp diffuser or reflector. The first problem with the diffuser was compatibility, considering the many different diffuser sizes and shapes available.

Fixture assemblies are typically mounted with a hook-and-eye type system. This allows the fixture to swing freely if acted on by an external force. At least two problems come out of this fixture mounting system. First, the added weight of the sensor mounted to the diffuser creates an unbalanced condition, which often skews the lamp and any occupancy sensor. This makes it very difficult to align the occupancy sensor and sometimes requires a ballast to be added. The second problem relates to the free-swinging nature of the fixture. After an occupancy sensor has been aligned, any movement of the fixture due to contact or airflow immediately nullifies or introduces error to the alignment.

When mounting an occupancy sensor on a diffuser, it must be attached to the exterior of the diffuser so that it does not block that light from the lamp. It must also be aligned with the coverage area. The occupancy sensor must be attached at a location around the perimeter of the diffuser that allows alignment with the desired coverage area, and often the mounting bracket has to be bent to center the pattern within the coverage area. This is not a very accurate method.

Mounting and aligning according to techniques of this disclosure using mounting adapter assembly 1200 is fast and effective. Unlike conventional systems, the occupancy sensor 413 need not be mounted directly on the lamp fixture 108. This eliminates the previous problems of fixture assembly alignment and movement.

One embodiment of a suitable mounting system is shown in FIG. 9. There, element 417 shows a rigid mounted ¾" EMT mounting pipe, although it will be understood that other mounting pipe sizes may be used. Pipe 417 may be mounted directly to a building's framework using any of many industry approved mounting methods.

With reference still to FIG. 9, once the mounting pipe 417 has been mounted and plumbed, installation begins. A lock nut 1201 (which may be ¾" EMT lock nut) is threaded onto the already mounted pipe 417. This is a safety requirement. The two parts (418 and 419) of the mounting adapter assembly 1200 are attached next. The mounting adapter 418 and jam nut 419 are threaded onto pipe 417. Once the mounting adapter 418 is hand tight, one can lock into place with the lock nut 1201.

The mounting adapter 418 is designed with at least three useful features. The first feature is the internal threads 1202 used for mounting to a mounting pipe 417, which may be in one embodiment a ¾" EMT pipe. The second feature is the external threads 1203 used for locating jam nut 419. The last feature is a step 1204, which may revolve around the center axis of the modular lamp controller 400 and can be used for locating, supporting, and locking the modular lamp controller 400 into place.

The jam nut 419 should be threaded tightly against the mounting adapter 418. This will ensure enough room to install the modular lamp controller 400. The housing 407 of the modular lamp controller 400 may have a helpful feature relating to the mounting adapter assembly 1200. This feature includes of two bosses 1205 that extend out past center to encompass the step 1204.

Figure 5:
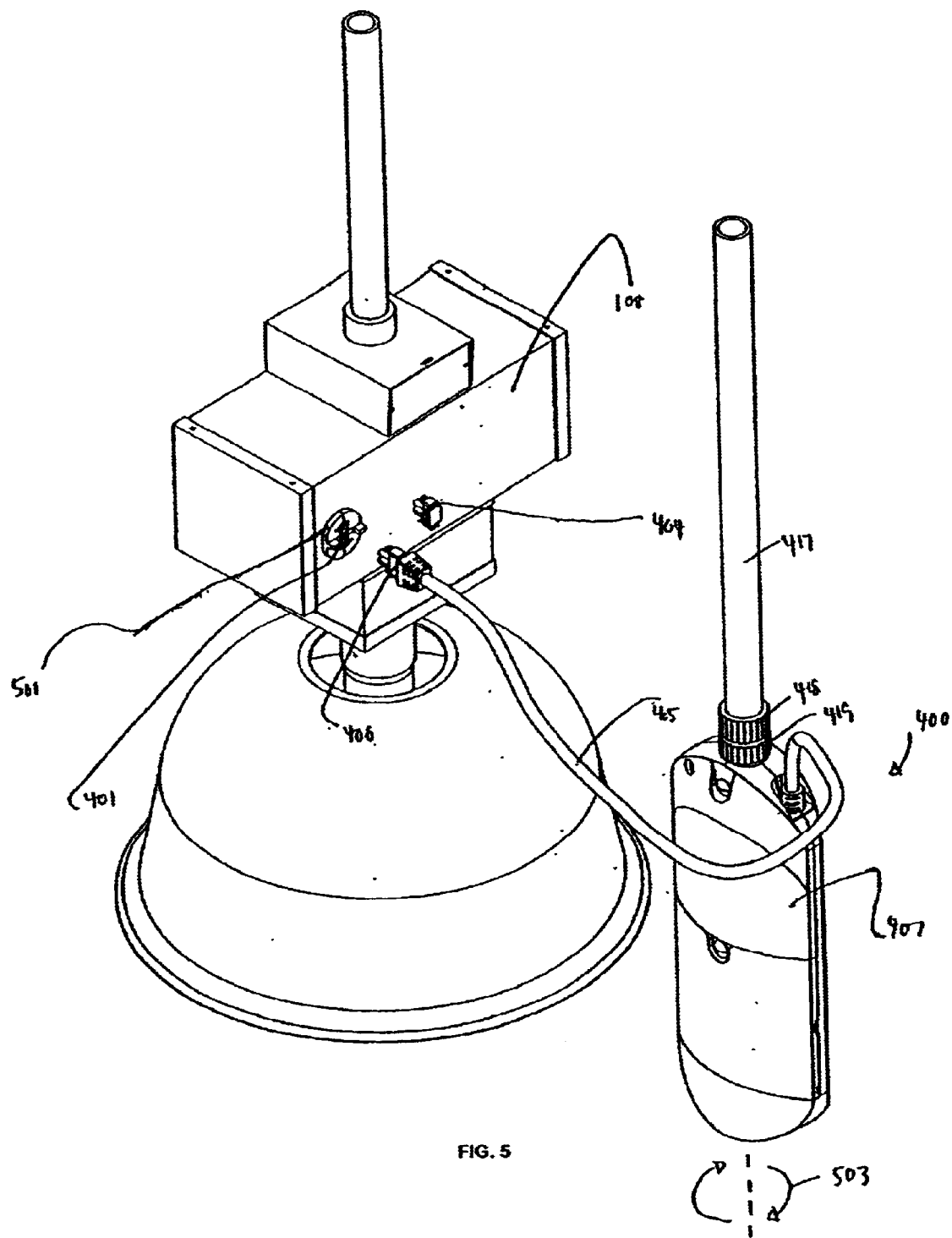
FIG. 5 is schematic diagram showing another view of a modular lamp controller, according to embodiments of the present disclosure.

When the housing 407 is installed over the mounting adapter assembly 1200 (see FIG. 10), the modular lamp controller 400 can hang without further support and rotate freely about the axis of the mounting pipe (see 503 of FIG. 5). This feature allows the installer to complete other tasks before finalizing the installation. When the installer is ready, housing 407 may be secured with screw 1207 or another fastening member. This secures the mounting adapter assembly 1200 to the housing 407 but still allows for full rotation of the housing (503 of FIG. 5).

The capability to rotate the modular lamp controller 400 freely allows for easy and precise alignment. The laser alignment tool 1400 may be attached for precise adjustment. The laser alignment tool 1400 indicates a location below modular lamp controller 400 that is in line with the optics of the occupancy sensor 413. When this indicates that the optics are in line with a desired area or target, the occupancy sensor 413 is in the correct position. When the occupancy sensor 413 is in the correct position, the jam nut 419 may be tightened against the modular lamp controller housing 407 to lock everything into place. (See FIG. 10) This locks the modular lamp controller 400 into position because as the jam nut 419 is tightened up against the modular lamp controller housing 407, the mounting adapter 418 is pulled by the jam nut 419 and traps the modular lamp controller housing 407 into place (see FIG. 10).

Following mounting, the modular lamp controller 400 is ready to be tested. If any further adjustments are needed, the jam nut 419 may simply be loosened and the modular lamp controller 400 readjusted.

As will be readily understood by those of ordinary skill in the art, the method described above is not the only mounting option for the mounting adapter assembly 1200. If there is no need to access the inside of the unit, the modular lamp controller 400 may be pre assembled including the mounting adapter assembly 1200. This may be done on the ground or at a different location than the final location. The completed modular lamp controller 400 can be threaded onto, for example, a ¾" EMT pipe and secured by the lock nut 419. The aiming of the modular lamp controller 400 is the same as above.

The following examples are included to demonstrate specific, non-limiting embodiments of this disclosure. It should be appreciated by those of skill in the art that the techniques disclosed in the examples that follow represent techniques discovered by the inventors to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Product Specifications of Exemplary Modular Lamp Controller

For use with CWA (Constant Wattage Auto-Transformer) ballast's

Lamp Type Controlled: 175 W to 1,650 W Metal Halide 175 W to 720 W Pulse Start Metal Halide 250 W to 1,000 W High Pressure Sodium Ballast Compatibility: Compatible with every manufacturer of CWA ballast's Initial Lamp Warm up time: 15 minutes Warm up Time if lamp goes out: 15 minutes after lamp current is detected Lamp switching: Solid state switching and microprocessor watch dog provides reliable zero cross voltage switching from low to high and zero cross current switching from high to low. Inrush protected.

Continuous Dim Lamp Protection: The microprocessor monitors continuous dim time of the lamp. Each lamp bright cycle resets this timer. If lamp is dimmed continuously for 24 hours, lamp is automatically cycled to full power for 15 minutes to increase lamp life.

Capacitor: Series dim capacitor is mounted inside module. Maximum capacitor size 3 ⅞" D oval. Capacitor value is selected based on ballast manufacturing specifications.

Sensor Self-adjusting: Digital microprocessor constantly adjusts sensitivity for optimum performance.

Sensor Optics: 9.6 square inches of optical lens @ 2.15" focal length. (For long range sensing applications, the greater optical area and longer focal length increase performance).

Sensor Range Pattern: (4) interchange lens options (3 aisle lens for mounting 12' to 50' above floor & 1 square area lens) available to match control application. Each lens is color-coded.

Laser alignment: Allows accurate aiming of sensor pattern to within +/−2 degrees Sensor masking: Externally mounted, black sensor mask covers half the sensor lens for asymmetrical coverage and is easily modified to mask out motion from unwanted areas.

Sensor Timer Settings: 2,4,8,16,64 min, and 10 second test mode

Force Dim Option: After lamp warm up, sensor is disabled and lamp will dim continuously. Continuous dim protection is still active.

Self Diagnostics Test Button: Momentary push button initiates self diagnostic to verify controller is functioning properly.

User Interface: 4 dip switches and self diagnostic push button

Mounting: ¾" Threaded pipe mounting adapter with security screw. Mount sensor lens even or below fixture reflector.

Power Cord: Interchangeable 3' and 6' power cords with plug.

Operating Temperature Range: (Indoor use only): −22 degrees F. to +149 degrees F. (−30 degrees C. to +65 degrees C.)

Weight: Less than 3 lbs. (without dim capacitor installed)

Dimensions: 13.25" H×5.5" W×2.6" D (33.6×14.0×6.6 cm)

Construction: Rugged, high impact, injection-molded plastic.

With the benefit of the present disclosure, those having skill in the art will comprehend that techniques claimed herein and described above may be modified and applied to a number of additional, different applications, achieving the same or a similar result. The claims attached hereto cover all such modifications that fall within the scope and spirit of this disclosure. For example, although the description of this disclosure focuses upon embodiments well suited for use with high intensity discharge lamps, those of ordinary skill in the art having the benefit of this disclosure will recognize that the inventions described herein may be used to control a wide variety of different types of lamps and equipment in general. By way of example, the modular lamp controller concepts of this disclosure may be applied to control lamps of all types and any equipment that may benefit from operating at one or more reduced power states. Although the description of this disclosure focuses upon embodiments in which laser alignment tools and mounting assembly units are used in conjunction with modular lamp controllers, it will be understood that those tools may be used as well to align and mount any equipment, including but not limited to stand-alone occupancy sensors.

What is claimed is:

1. A laser alignment system for an occupancy sensor, the system comprising:
   an occupancy sensor;
   a bracket;
   a clip coupled to the bracket and removably coupled to the occupancy sensor; and
   a laser coupled to the bracket and positioned to align a field of view of the occupancy sensor.

2. The system of claim 1, the clip being coupled to a recess of the occupancy sensor.

3. The system of claim 2, the clip and recess being configured to couple together upon rotation of the clip within the recess.

4. A mounting adapter assembly for mounting an occupancy sensor, the mounting adapter assembly comprising:

a jam nut; and a mounting adapter comprising internal threads for connecting to a mounting pipe, external threads for locating the jam nut, and a step configured to revolve around an axis of the mounting adapter, the step being configured to rotatably lock the occupancy sensor.

5. The mounting adapter assembly of claim 4, the step being configured to rotatably lock the occupancy sensor and a modular lamp controller coupled to the occupancy sensor.

6. An apparatus for mounting and aligning a modular lamp controller, comprising:

a mounting adapter assembly configured to couple to a housing of the modular lamp controller, the mounting adapter assembly comprising:

a jam nut; and a mounting adapter comprising internal threads for connecting to a mounting pipe, external threads for locating the jam nut, and a step configured to revolve around an axis of the mounting adapter, the step being configured to rotatably lock the housing; and a laser alignment tool configured to couple to the housing, the laser alignment tool comprising:

a bracket configured to couple to the housing; and a laser coupled to the bracket.

7. The apparatus of claim 6, the step being configured to revolve around a center axis of the mounting adapter.

8. The apparatus of claim 6, the laser alignment tool further comprising a clip coupled to the bracket, the clip being configured to fit into a recess of the housing to secure and position the laser alignment tool relative to the housing.

9. The apparatus of claim 8, the clip being configured to fit into the recess and rotate therein to secure and position the laser alignment tool relative to the housing.

10. The apparatus of claim 9, the clip being configured to fit into the recess and rotate 90 degrees therein to secure and position the laser alignment tool relative to the housing.

11. The apparatus of claim 6, further comprising a lock nut configured to connect to the mounting pipe.

12. A method for mounting and aligning a modular lamp controller, comprising:

threading a mounting adapter onto a mounting pipe using interior threads of the mounting adapter;

threading a jam nut onto the mounting adapter using exterior threads of the mounting adapter;

inserting a step of the mounting adapter into a housing of the modular lamp controller to rotatably lock the housing;

aligning the modular lamp controller using a laser alignment tool coupled to the housing; and tightening the jam nut against the housing to lock the modular lamp controller in place.

13. The method of claim 12, the aligning the modular lamp comprising rotating the housing until a laser spot from the laser alignment tool is aligned with a target.

14. The method of claim 13, further comprising attaching a lock nut to the mounting pipe.

* * * * *